(12) United States Patent
Koizumi et al.

(10) Patent No.: US 9,405,107 B2
(45) Date of Patent: Aug. 2, 2016

(54) ZOOM LENS AND IMAGING APPARATUS

(71) Applicant: FUJIFILM Corporation, Tokyo (JP)

(72) Inventors: Noboru Koizumi, Saitama-ken (JP); Michio Cho, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/627,047

(22) Filed: Feb. 20, 2015

(65) Prior Publication Data

US 2015/0160444 A1 Jun. 11, 2015

Related U.S. Application Data

(63) Continuation of application No. PCT/JP2013/004636, filed on Jul. 31, 2013.

(30) Foreign Application Priority Data

Aug. 22, 2012 (JP) ................. 2012-182810

(51) Int. Cl.
*G02B 9/34* (2006.01)
*G02B 15/17* (2006.01)
*G02B 13/18* (2006.01)
*G02B 13/00* (2006.01)
*G02B 15/20* (2006.01)

(52) U.S. Cl.
CPC .............. *G02B 15/17* (2013.01); *G02B 13/009* (2013.01); *G02B 13/18* (2013.01); *G02B 15/20* (2013.01)

(58) Field of Classification Search
CPC ...... G02B 15/17; G02B 15/20; G02B 13/009; G02B 13/18; G02B 15/26; G02B 13/004; G02B 9/34; G02B 9/36
See application file for complete search history.

(56) References Cited

U.S. PATENT DOCUMENTS 5,627,682 A 5/1997 Nagaoka
7,599,124 B2 10/2009 Li et al.

FOREIGN PATENT DOCUMENTS

| JP | 62-27712 | 2/1987 | |
| JP | 07-159693 | 6/1995 | |
| JP | 2002-072092 | 3/2002 | |
| JP | 2002072092 | * 3/2002 | ........... G02B 15/167 |
| JP | 4880498 | 2/2012 | |

OTHER PUBLICATIONS

International Search Report PCT/JP2013/004636 dated Nov. 12, 2013.
German Office Action dated Jan. 28, 2016; File No. 11 2013 004 140.5.
Chinese Official Action—201380043535.0—Apr. 5, 2016.

* cited by examiner

*Primary Examiner* — Joseph P Martinez
(74) *Attorney, Agent, or Firm* — Young & Thompson

(57) ABSTRACT

A zoom lens consists essentially of a positive first lens group, a negative second lens group, a negative third lens group, and a positive fourth lens group. During zooming from the wide angle end to the telephoto end, the first lens group and the fourth lens group are fixed, the third lens group is moved monotonously from the object side to the image side, and the second lens group is moved to correct an image plane variation associated with the zooming When the amounts of movements of the second lens group and the third lens group are taken as M2 and M3 respectively, the zoom lens satisfies a conditional expression (1): 0<M2/M3<1.0, where each of M2 and M3 is given a positive sign for a movement to the image side.

20 Claims, 12 Drawing Sheets

ZOOM LENS AND IMAGING APPARATUS

CROSS-REFERENCE TO RELATED APPLICATIONS

This application is a Continuation of PCT International Application No. PCT/JP2013/004636 filed on Jul. 31, 2013, which claims priority under 35 U.S.C. §119 (a) to Japanese Patent Application No. 2012-182810 filed on Aug. 22, 2012. Each of the above applications is hereby expressly incorporated by reference, in its entirety, into the present application.

BACKGROUND OF THE INVENTION

1. Technical Field

The present invention relates to a zoom lens and an imaging apparatus, and more specifically to a zoom lens that can be used with electronic cameras, such as digital cameras, video cameras, broadcasting cameras, motion picture cameras, surveillance cameras, and the like, and an imaging apparatus equipped with the zoom lens.

2. Background Art

Heretofore, downsizing has been demanded for telephoto zoom lenses installed in the cameras of the foregoing fields. Relatively compact telephoto zoom lenses that have been proposed so far may include, for example, those described in Japanese Patent No. 4880498 and Japanese Unexamined Patent Publication No. 7(1995)-159693. The zoom lens described in Japanese Patent No. 4880498 includes a positive first lens group, a negative second lens group, a positive third lens group, and a positive fourth lens group disposed in order from the object side, and zooming is performed by moving the second lens group and the third lens group. The zoom lens described in Japanese Unexamined Patent Publication No. 7 (1995)-159693 includes a positive first lens group, a negative second lens group front group, a negative second lens group rear group, and a positive third lens group disposed in order from the object side, and zooming is performed by moving the second lens group front group and the second lens group rear group.

SUMMARY OF THE INVENTION

Recently, the demand for downsizing has been increasing and, in particular, reduction in the overall length (distance from the most object side surface to the image plane on the optical axis) of a lens system has been strongly demanded. For example, in telephoto zoom lenses with a zoom ratio of about 3.5, a lens system whose overall length is reduced to about 1.0 time of the focal length at the telephoto end is demanded. The zoom lens described in Japanese Patent No. 4880498, however, has an insufficient zoom ratio, i.e., about 2.8, and the overall length of the lens system is 1.2 times of the focal length at the telephoto end or longer, so that it cannot respond to the recent demand. The zoom lens described in Japanese Unexamined Patent Publication No. 7 (1995)-159693 has a zoom ratio of 5.8 but the overall length of the lens system is 1.7 times of the focal length at the telephoto end or longer, so that it cannot respond to the recent demand after all.

The present invention has been developed in view of the circumstances described above, and it is an object of the present invention to provide a zoom lens reduced in overall length of the lens system relative to the zoom ratio, for example, a zoom lens whose overall length can be reduced to 1.0 time of the focal length at the telephoto end in telephoto zoom lenses with a zoom ratio of about 3.5. It is a further object of the present invention to provide an imaging apparatus equipped with such a zoom lens.

A zoom lens of the present invention is a zoom lens consisting essentially of four lens groups, composed of a first lens group having a positive refractive power, a second lens group having a negative refractive power, a third lens group having a negative refractive power, and a fourth lens group having a positive refractive power, in order from the object side, wherein, upon zooming from the wide angle end to the telephoto end, the first lens group and the fourth lens group are fixed with respect to the image plane, the third lens group is moved monotonously from the object side to the image side, and the second lens group is moved to correct an image plane variation associated with the zooming, and the zoom lens satisfies a conditional expression (1) given below:

$$0 < M2/M3 < 1.0 \tag{1}$$

where

M2: amount of movement of the second lens group upon zooming from the wide angle end to the telephoto end, and M3: amount of movement of the third lens group upon zooming from the wide angle end to the telephoto end, in which the sign of each of M2 and M3 is positive for a movement to the image side.

The foregoing expression "the third lens group is moved monotonously from the object side to the image side" as used herein refers to that the third lens group is moved from the object side to the image side without moving backward.

Note that M2 is the difference in position of the second lens group on the optical axis at the wide angle end and at the telephoto end.

The zoom lens of the present invention preferably satisfies a conditional expression (1-1) given below, and more preferably satisfies a conditional expression (1-2) given below:

$$0 < M2/M3 < 0.5 \tag{1-1}$$

$$0.15 < M2/M3 < 0.35. \tag{1-2}$$

The zoom lens of the present invention preferably satisfies a conditional expression (2) given below, and more preferably satisfies a conditional expression (2-1) given below:

$$1.01 < |f2/fw| < 2.0 \tag{2}$$

$$1.1 < |f2/fw| < 1.8 \tag{2-1}$$

where f2: focal length of the second lens group, and fw: focal length of the entire system at the wide angle end.

Further, the zoom lens of the present invention preferably satisfies a conditional expression (3) given below, and more preferably satisfies a conditional expression (3-1) given below:

$$0.41 < |f3/fw| < 0.9 \tag{3}$$

$$0.45 < |f3/fw| < 0.8 \tag{3-1}$$

where f3: focal length of the third lens group, and fw: focal length of the entire system at the wide angle end.

Still further, the zoom lens of the present invention preferably satisfies a conditional expression (4) given below, and more preferably satisfies a conditional expression (4-1) given below:

$$1.0 < f1/fw < 1.5 \tag{4}$$

$$1.1 < f1/fw < 1.45 \tag{4-1}$$

where
  f1: focal length of the first lens group, and
  fw: focal length of the entire system at the wide angle end.

Further, the zoom lens of the present invention preferably satisfies a conditional expression (5) given below, and more preferably satisfies a conditional expression (5-1) given below:

$$0.6 < f4/fw < 1.0 \qquad (5)$$

$$0.7 < f4/fw < 0.9 \qquad (5\text{-}1)$$

where
  f4: focal length of the fourth lens group, and
  fw: focal length of the entire system at the wide angle end.

Still further, in the zoom lens of the present invention, the first lens group is composed essentially of a first-a lens group having a positive refractive power and is fixed with respect to the image plane upon focusing and a first-b lens group having a positive refractive power and is moved upon focusing, in order from the object side, and the zoom lens preferably satisfies conditional expressions (6) and (7) given below, and more preferably satisfies conditional expressions (6-1) and (7-1) given below:

$$2.0 < f1a/f1 < 3.7 \qquad (6)$$

$$1.0 < f1b/f1 < 1.8 \qquad (7)$$

$$2.2 < f1a/f1 < 3.3 \qquad (6\text{-}1)$$

$$1.2 < f1b/f1 < 1.6 \qquad (7\text{-}1)$$

where
  f1a: focal length of the first-a lens group,
  f1b: focal length of the first-b lens group, and
  f1: focal length of the first lens group.

Still further, in the zoom lens of the present invention, the fourth lens group is composed essentially of a fourth-a lens group having a positive refractive power, a stop, and a fourth-b lens group in order from the object side, and the zoom lens preferably satisfies conditional expressions (8) and (9) given below, and more preferably satisfies conditional expressions (8-1) and (9-1) given below:

$$0.4 < f4a/f4 < 1.2 \qquad (8)$$

$$-0.4 < f4/f4b < 0.6 \qquad (9)$$

$$0.5 < f4a/f4 < 1.0 \qquad (8\text{-}1)$$

$$-0.2 < f4/f4b < 0.45 \qquad (9\text{-}1)$$

where
  f4a: focal length of the fourth-a lens group,
  f4b: focal length of the fourth-b lens group, and
  f4: focal length of the fourth lens group.

In the case where the zoom lens of the present invention includes the foregoing fourth-b lens group, the fourth-b lens group is composed essentially of a fourth-b1 lens group having a negative refractive power and is fixed with respect to the image plane upon focusing in near view imaging and a fourth-b2 lens group having a positive refractive power and is moved upon focusing in near view imaging in order from the object side and the zoom lens preferably satisfies a conditional expression (10) given below:

$$-0.1 < fw/fA < 0.1 \qquad (10)$$

where
  fw: focal length of the entire system at the wide angle end, and
  fA: focal length of an optical system that combines the first lens group to the fourth-b1 lens group at the wide angle end.

Further, in the zoom lens of the present invention, the second lens group is composed essentially of a $21^{st}$ lens with a concave surface on the image side, a $22^{nd}$ lens having a positive refractive power with a convex surface on the image side, and a $23^{th}$ lens having a negative refractive power with a concave surface on the object side in order from the object side, and preferably satisfies a conditional expression (11) given below:

$$vd22 < vd23 < 50 \qquad (11)$$

where
  vd22: Abbe number of the $22^{nd}$ lens with respect to the d-line, and
  vd23: Abbe number of the $23^{th}$ lens with respect to the d-line.

An imaging apparatus of the present invention is equipped with the foregoing zoom lens of the present invention.

The foregoing each "lens group" is not necessarily composed of a plurality of lenses and may include a lens group composed of only one lens.

The term "essentially" in the context of "consisting essentially of" as used herein intends that the zoom lens of the present invention may include a lens having substantially no refractive power, an optical element other than a lens, such as a stop, a cover glass, a filter, or the like, a lens flange, a lens barrel, an image sensor, a mechanical component, such as a camera shake correction mechanism, and the like, other than the constituent elements described above.

Note that the surface shapes and the signs of the refractive powers of the foregoing lenses are decided within the paraxial region for those having an aspherical surface.

Note the each focal length used in each conditional expression is the focal length in the lens arrangement when the entire system is in focus on an object at infinity.

The zoom lens of the present invention consists of four lens groups, composed of a positive lens group, a negative lens group, a negative lens group, and a positive lens group, in order from the object side, in which zooming is performed mainly by moving the third lens group, while the second lens group is moved to correct an image plane variation associated with the zooming This allows the rear principal point position of the optical system that combines the first lens group and the second lens group to be shifted toward the object side. Therefore, according to the zoom lens of the present invention, the overall length of the lens system can be reduced relative to the zoom ratio while maintaining the optical performance favorably.

As the imaging apparatus of the present invention is equipped with the zoom lens of the present invention, it is possible to achieve a compact configuration relative to the zoom ratio and a favorable image can be obtained.

Figure 7:
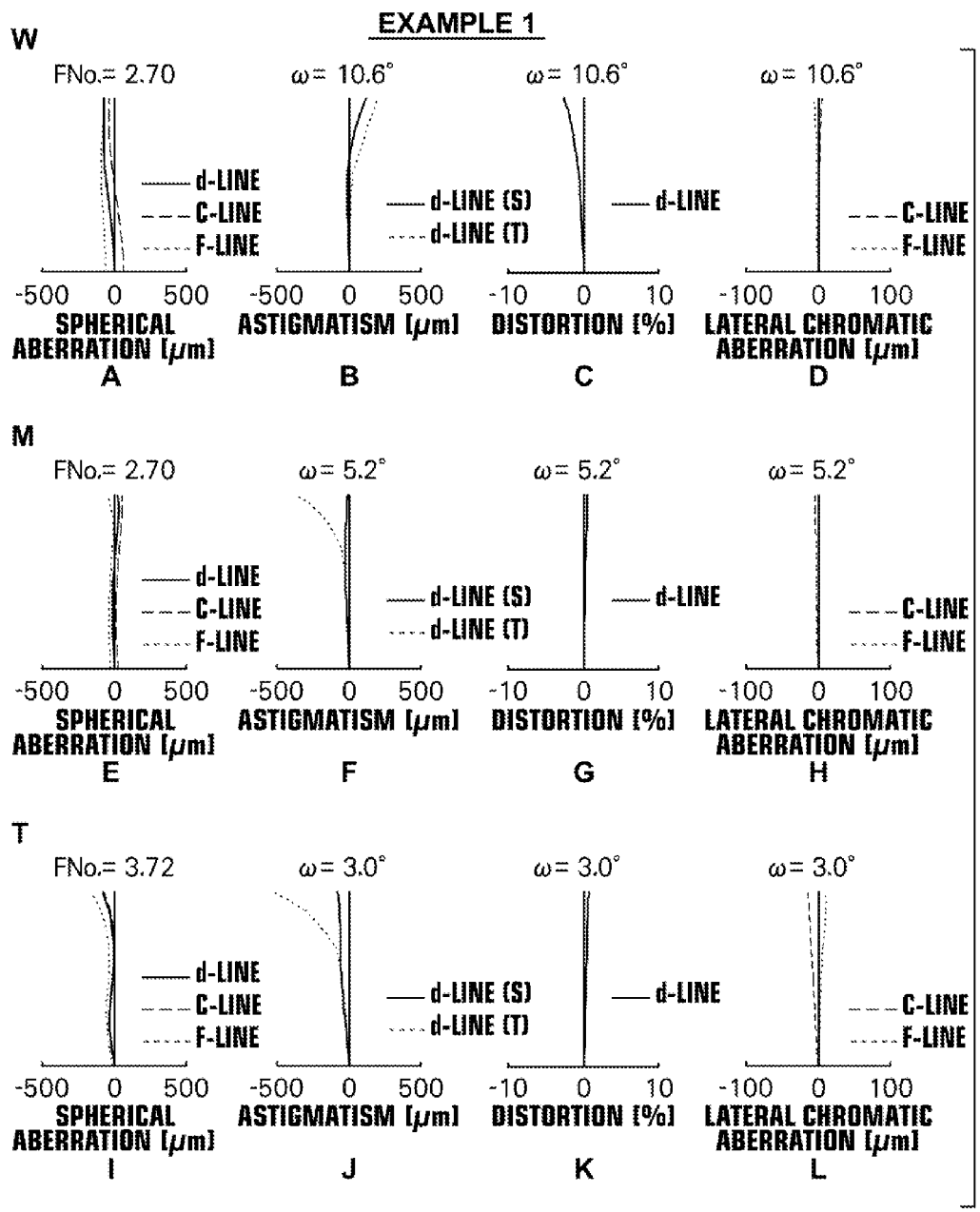

A to L of FIG. 7 illustrate each aberration diagram of the imaging lens of Example 1.

Figure 8:
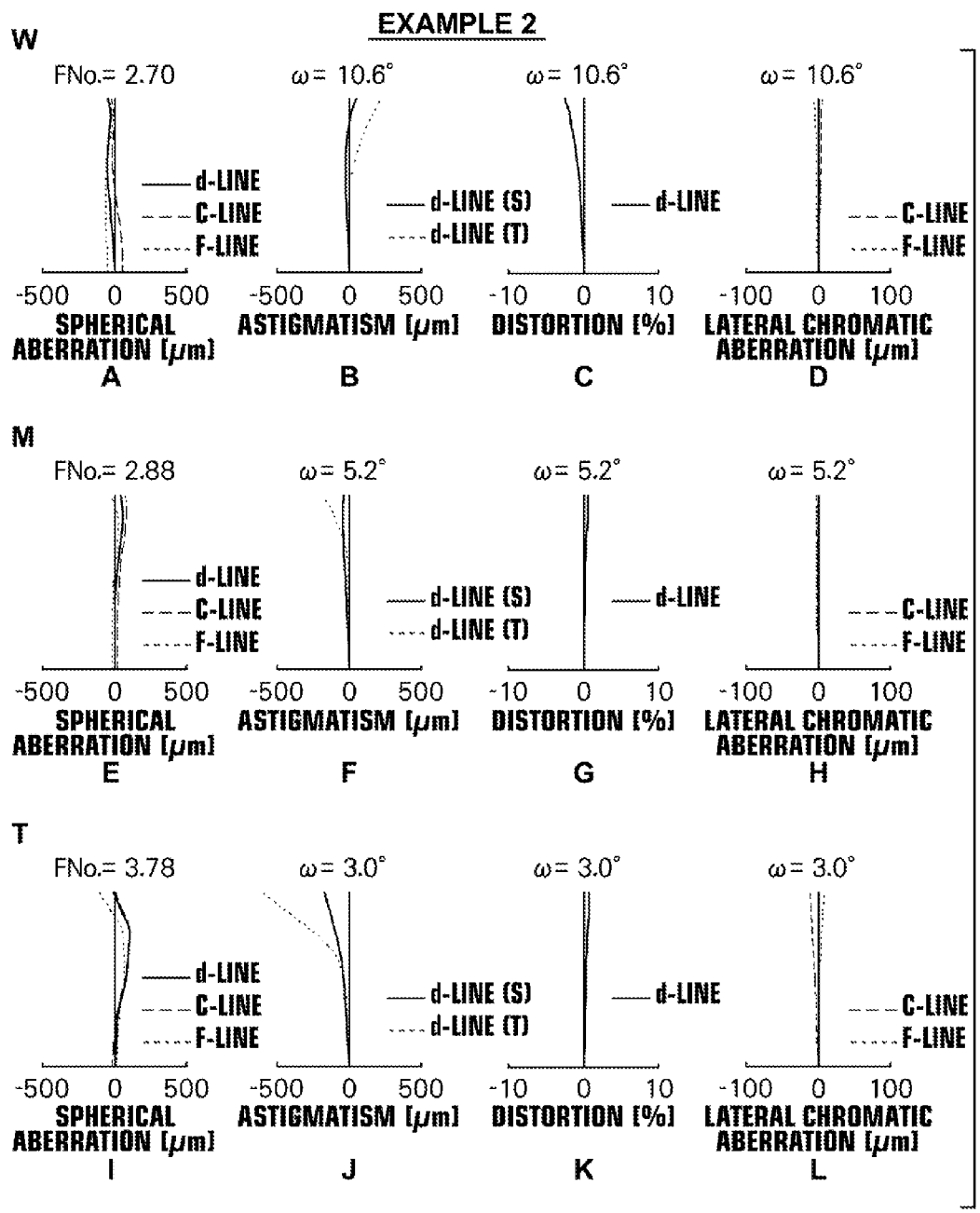

A to L of FIG. 8 illustrate each aberration diagram of the imaging lens of Example 2.

Figure 9:
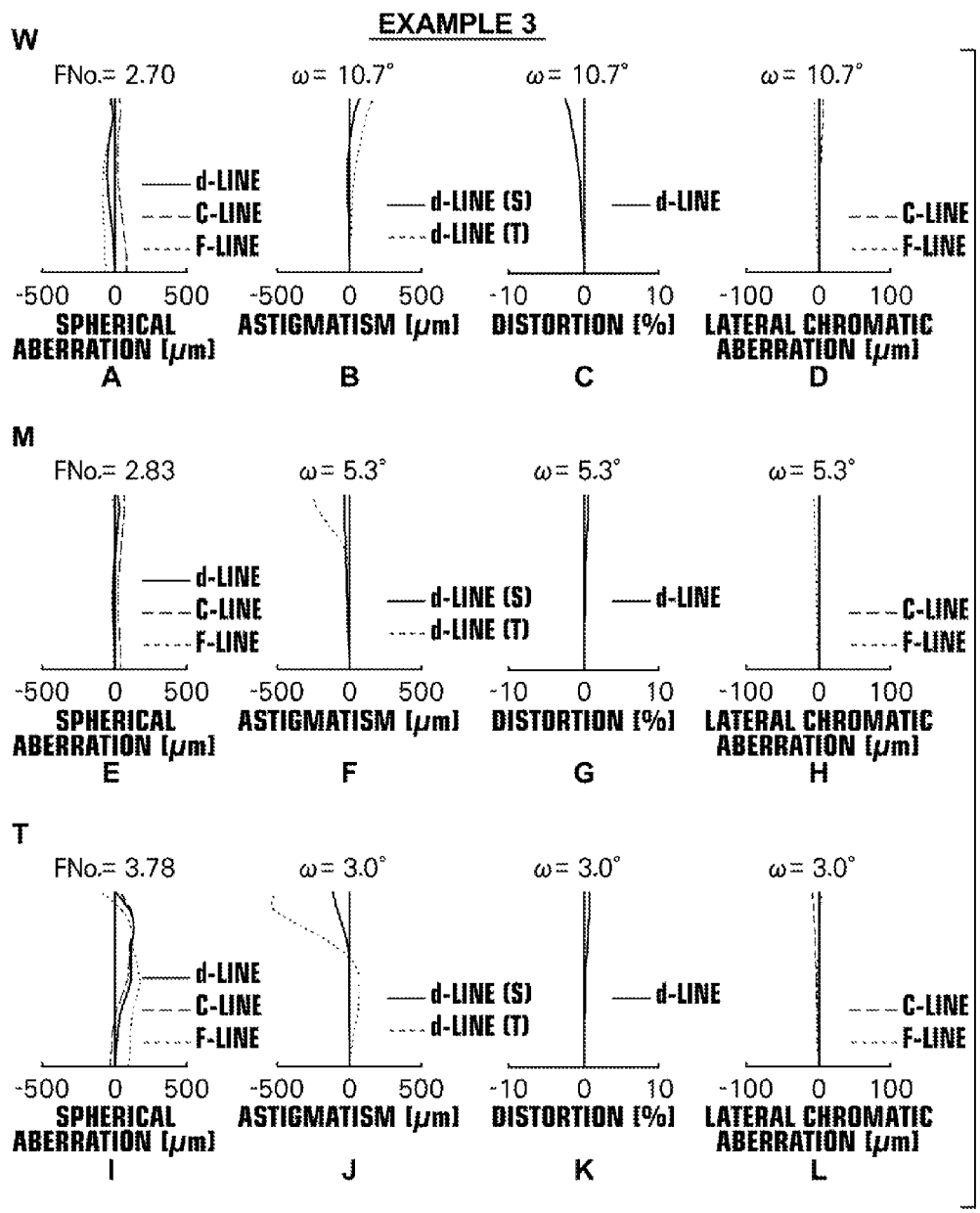

A to L of FIG. 9 illustrate each aberration diagram of the imaging lens of Example 3.

Figure 10:
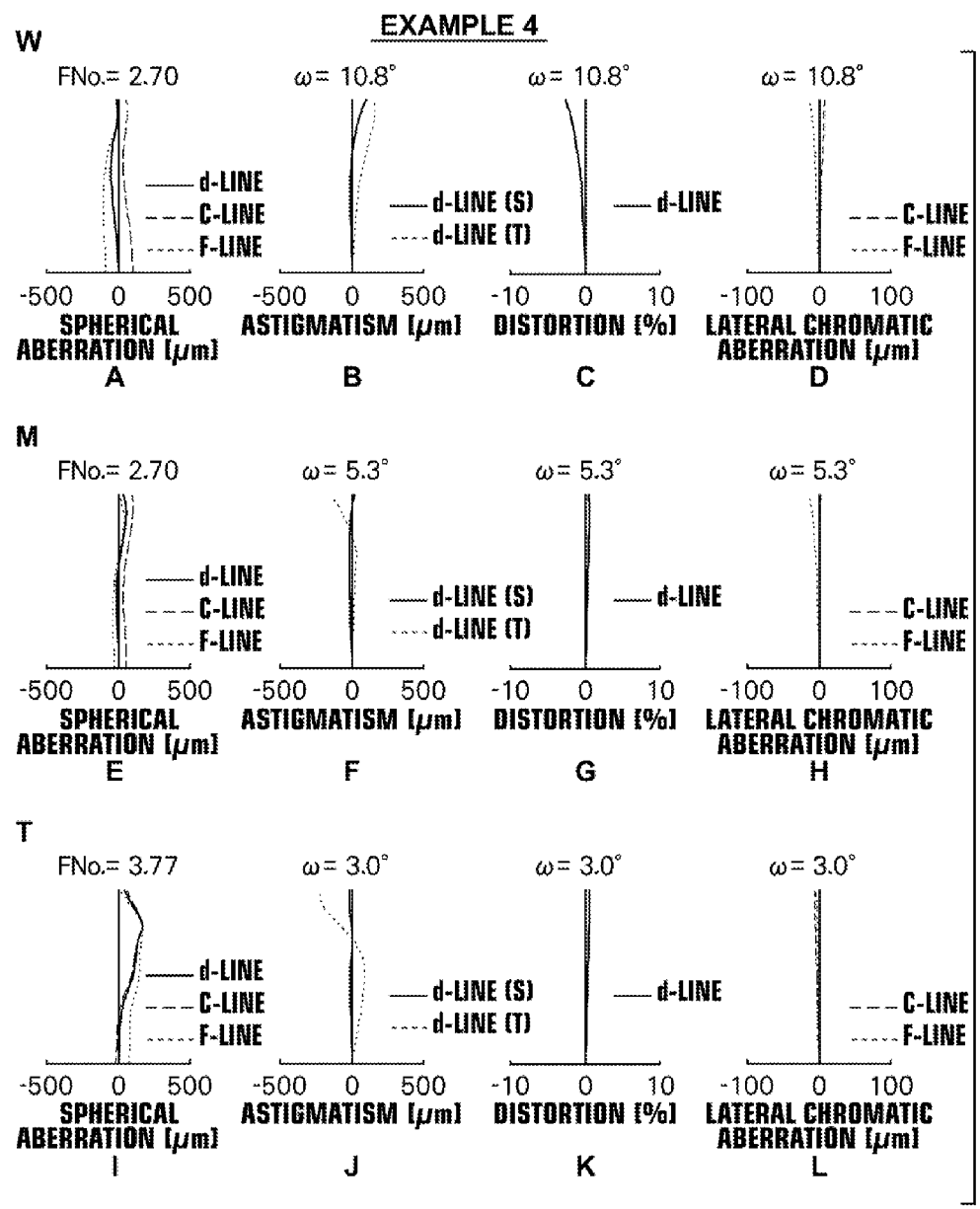

A to L of FIG. 10 illustrate each aberration diagram of the imaging lens of Example 4.

Figure 11:
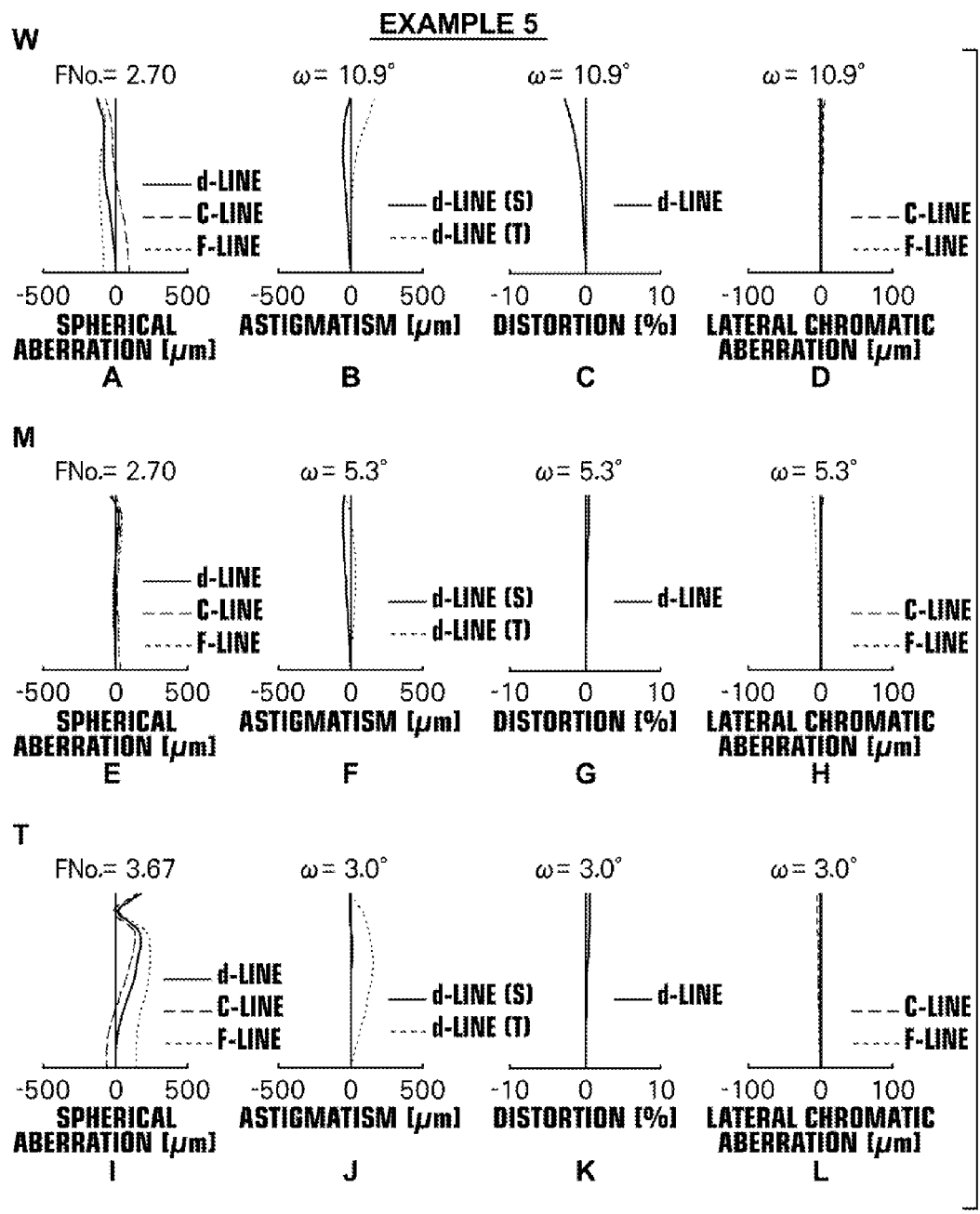

A to L of FIG. 11 illustrate each aberration diagram of the imaging lens of Example 5.

Figure 12:
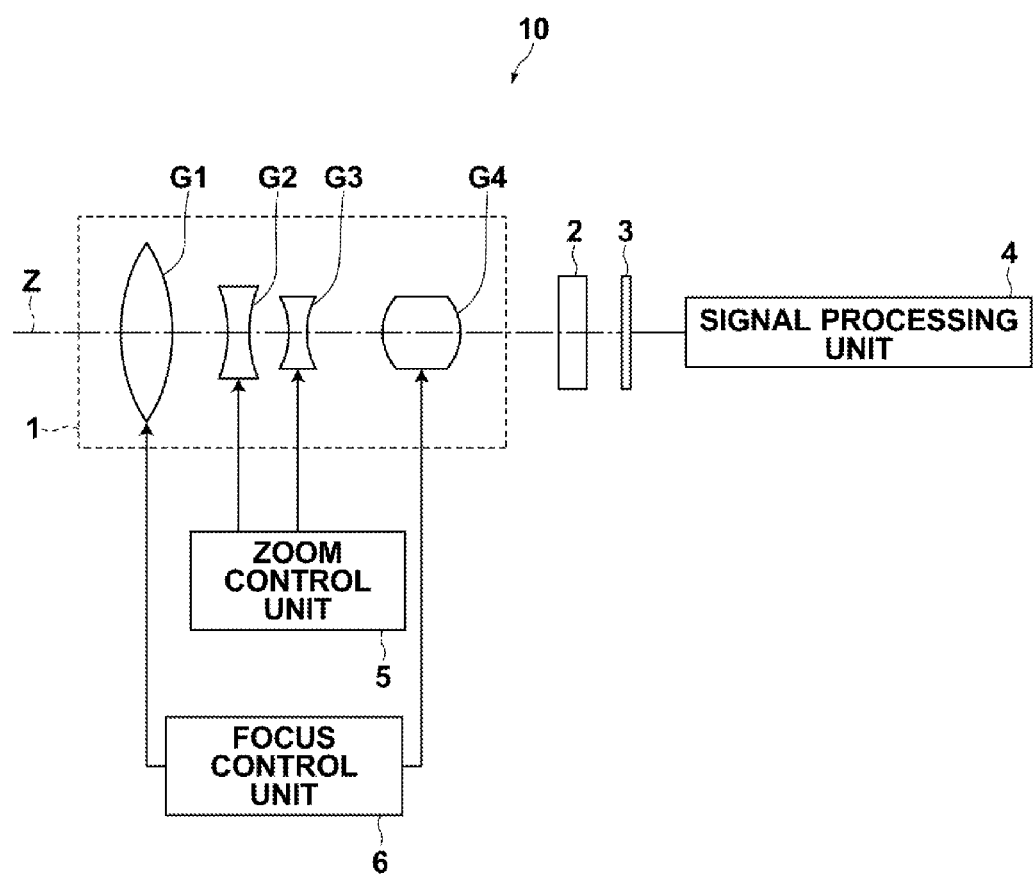

FIG. 12 is a schematic configuration diagram of an imaging apparatus according to one embodiment of the present invention.

DESCRIPTION OF THE PREFERRED EMBODIMENTS

Figure 1:
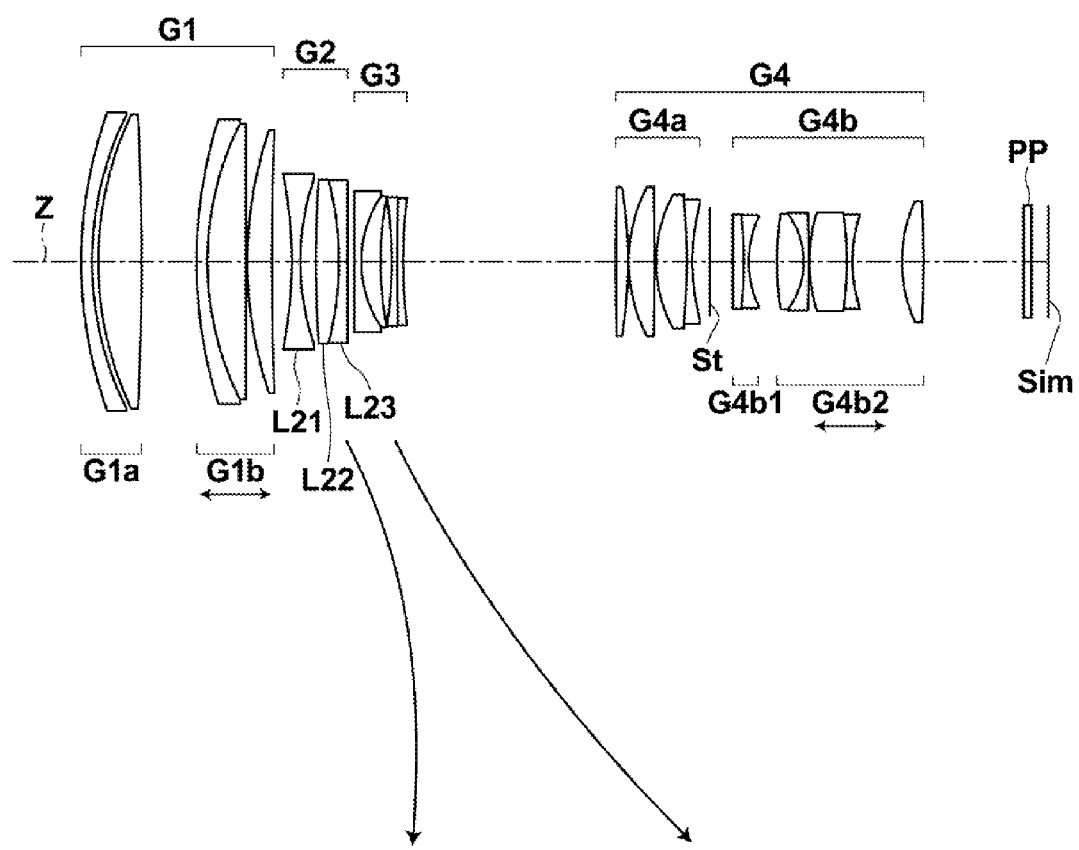
FIG. 1 is a cross-sectional view of a zoom lens according to one embodiment of the present invention, illustrating the lens configuration thereof.

Hereinafter, embodiments of the present invention will be described in detail with reference to the accompanying drawings. FIG. 1 is a cross-sectional view of a zoom lens according to one embodiment of the present invention, illustrating the lens configuration at the wide angle end. The example shown in FIG. 1 corresponds to Example 1, to be described later. In FIG. 1, the left side is the object side and the right side is the image side and FIG. 1 illustrates the zoom lens in a state in which an object at infinity is in focus.

As it is preferable that, when the zoom lens is applied to an imaging apparatus, a cover glass and various types of filters, such as a low-pass filter, an infrared cut filter, and the like, are disposed between the optical system and the image plane Sim according to the structure on the imaging apparatus side to which the lens is attached, FIG. 1 illustrates an example in which a parallel plate optical member PP assuming these is disposed between the lens system and the image plane Sim. But the optical member PP is not an essential component of the zoom lens of the present invention.

The zoom lens of the present invention consists essentially of four lens groups, composed of a first lens group G1 having a positive refractive power, a second lens group G2 having a negative refractive power, a third lens group G3 having a negative refractive power, and a fourth lens G4 having a positive refractive power disposed in order from the object side along the optical axis Z. In the example shown in FIG. 1, the fourth lens group G4 includes an aperture stop St. The aperture stop St shown in FIG. 1, however, does not necessarily indicate the size or shape but the position on the optical axis Z.

The present zoom lens is configured such that, upon zooming from the wide angle end to the telephoto end, the first lens group G1 and the fourth lens group G4 are fixed with respect to the image plane Sim, the third lens group G3 is moved monotonously from the object side to the image side along the optical axis Z, and the second lens group G2 is moved along the optical axis Z to correct an image plane variation associated with the zooming. That is, in the present zoom lens, the third lens group G3 undertakes the roll of variator group and the second lens group G2 undertakes the roll of compensator group. FIG. 1 schematically illustrates the movement trajectories of the second lens group G2 and the third lens group G3 upon zooming from the wide angle end to the telephoto end by the solid lines below each lens group.

Conventionally, for a four group zoom lens, composed of a first lens group having a positive refractive power, a second lens group having a negative refractive power, a third lens group having a positive or negative refractive power, and a fourth lens group having a positive refractive power, disposed in order from the object side, in which the second lens group and the third lens group are moving groups, it has been customary to move the second lens group from the object side to the image side as the variator group while the third lens group functions as the compensator group upon zooming from the wide angle end to the telephoto end.

In contrast, in the zoom lens of the present embodiment, the third lens group G3 functions as the variator group while the second lens group G2 functions as the compensator group, whereby, upon zooming from the wide angle end to the telephoto end, the amount of movement of the second lens group G2 in an optical axis direction can be reduced in comparison with the general conventional example described above. This allows the rear principal point position (image side principal point position) of the optical system that combines the first lens group G1 and the second lens group G2 to be shifted toward the object side, in particular, at the telephoto end, which is advantageous for the overall length reduction of the lens system.

The present zoom lens is configured to satisfy a conditional expression (1) given below.

$$0 < M2/M3 < 1.0 \tag{1}$$

where

M2: amount of movement of the second lens group upon zooming from the wide angle end to the telephoto end, and M3: amount of movement of the third lens group upon zooming from the wide angle end to the telephoto end, in which the sign of M2 or M3 is positive if the second lens group G2 or the third lens group G3 moves to the image side, and negative if the second lens group G2 or the third lens group G3 moves to the object side.

If the zoom lens falls to or below the lower limit of the conditional expression (1), distortion is aggravated on the wide angle side. If the zoom lens reaches to or exceeds the upper limit of the conditional expression (1), it is difficult to cause the third lens group G3 to function as the variator and the second lens group G2 to function as the compensator, which is disadvantageous for the overall length reduction of the lens system.

The present zoom lens preferably further satisfies a conditional expression (1-1) given below.

$$0 < M2/M3 < 0.5. \tag{1-1}$$

If the lens system reaches or exceeds the upper limit of the conditional expression (1-1), the distance from the most image surface of the first lens group G1 to the most object side surface of the fourth lens group G4 on the optical axis tends to increase in order to secure the space for the movement of the second lens group G2 and the third lens group G3 upon zooming, which is disadvantageous for the overall length reduction of the lens system. If the overall length of the lens system is reduced by forcibly reducing the distance from the most image surface of the first lens group G1 to the most object side surface of the fourth lens group G4 on the optical axis, the refractive powers of the second lens group G2 and the third lens group G3 are increased excessively, whereby aberrations, in particular, distortion at the wide angle end and spherical aberration at the telephoto end, are aggravated. Satisfaction of the conditional expression (1-1) is advantageous for the overall length reduction of the lens system and satisfactory correction of various types of aberrations.

In order to further enhance the foregoing operational effects of the conditional expression (1-1), the lens system preferably satisfies a conditional expression (1-2) given below:

$$0.15<M2/M3<0.35. \tag{1-2}$$

Further, the present zoom lens preferably satisfies a conditional expression (2) given below:

$$1.0<|f2/fw|<2.0 \tag{2}$$

where
 f2: focal length of the second lens group, and
 fw: focal length of the entire system at the wide angle end.
 If the lens system reaches or exceeds the upper limit of the conditional expression (2), the refractive power of the second lens group G2 is reduced and the amount of movement for compensating for an image plane variation associated with zooming is increased, whereby the overall length of the lens system is increased. Contrarily, if the lens system falls to or below the lower limit of the conditional expression (2), the refractive power of the second lens group G2 is increased, thereby causing degradation in spherical aberration. Further, it causes increase in the effective diameter of a lens in the first lens group G1, thereby resulting in disadvantage for downsizing. Satisfaction of the conditional expression (2) is advantageous for overall length reduction of the lens system, satisfactory correction of spherical aberration, and downsizing.

In order to further enhance the foregoing operational effects of the conditional expression (2), the lens system preferably satisfies a conditional expression (2-1) given below:

$$1.1<|f2/fw|<1.8. \tag{2-1}$$

Further, the present zoom lens preferably satisfies a conditional expression (3) given below:

$$0.4<|f3/fw|<0.9 \tag{3}$$

where
 f3: focal length of the third lens group, and
 fw: focal length of the entire system at the wide angle end.
 If the lens system reaches or exceeds the upper limit of the conditional expression (3), the refractive power of the third lens group G3 is reduced and the amount of movement during zooming is increased, whereby the overall length of the lens system is increased. If the lens system falls to or below the lower limit of the conditional expression (3), the refractive power of the third lens group G3 is increased excessively, thereby causing degradation in spherical aberration. Further, it causes increase in the effective diameter of a lens in the first lens group G1, thereby resulting in disadvantage for downsizing. Satisfaction of the conditional expression (3) is advantageous for overall length reduction of the lens system, satisfactory correction of spherical aberration, and downsizing.

In order to further enhance the foregoing operational effects of the conditional expression (3), the lens system preferably satisfies a conditional expression (3-1) given below:

$$0.45<|f3/fw|<0.8. \tag{3-1}$$

Further, the present zoom lens preferably satisfies a conditional expression (4) given below:

$$1.0<f1/fw<1.5 \tag{4}$$

where
 f1: focal length of the first lens group, and
 fw: focal length of the entire system at the wide angle end.
 If the lens system reaches or exceeds the upper limit of the conditional expression (4), the refractive power of the first lens group G1 is reduced and the overall length of the lens system is increased. If the lens system falls to or below the lower limit of the conditional expression (4), the refractive power of the first lens group is increased excessively, whereby the degradation in spherical aberration and the variation in aberrations upon focusing are increased. Satisfaction of the conditional expression (4) is advantageous for overall length reduction of the lens system, satisfactory correction of spherical aberration, and suppression of variation in aberrations upon focusing.

In order to further enhance the foregoing operational effects of the conditional expression (4), the lens system preferably satisfies a conditional expression (4-1) given below:

$$1.1<f1/fw<1.45. \tag{4-1}$$

Further, the present zoom lens preferably satisfies a conditional expression (5) given below:

$$0.6<f4/fw<1.0 \tag{5}$$

where
 f4: focal length of the fourth lens group, and
 fw: focal length of the entire system at the wide angle end.
 If the lens system reaches or exceeds the upper limit of the conditional expression (5), the focal length of the fourth lens group G4 is increased and the overall length of the lens system is increased. Contrarily, if the lens system falls to or below the lower limit of the conditional expression (5), degradation occurs in spherical aberration and field curvature, and sufficient back focus cannot be obtained. Satisfaction of the conditional expression (5) is advantageous for overall length reduction of the lens system, satisfactory correction of spherical aberration and field curvature, and assurance of sufficient back focus.

In order to further enhance the foregoing operational effects of the conditional expression (5), the lens system preferably satisfies a conditional expression (5-1) given below:

$$0.7<f4/fw<0.9. \tag{5-1}$$

Further, in the present zoom lens, the firs lens group G1 is preferably composed essentially of a first-a lens group G1$a$ having a positive refractive power and is fixed with respect to the image plane Sim upon zooming and a first-b lens group G1$b$ having a positive refractive power and is moved upon zooming in order from the object side. The first lens group G1 has a strong refractive power in order to reduce the overall length of the lens system. If the entire first lens group G1 is moved upon focusing, the variation in aberrations due to focusing is increased. Therefore, it is important to divide the first lens group G1 into the first-a lens group G1$a$ which is fixed upon focusing and the first-b lens group G1$b$ used for focusing.

Employment of such an inner focusing system allows the variation in aberrations during focusing to be reduced in comparison with the case in which the entire first lens group G1 is moved, as well as reducing the weight of the lens group which is moved during focusing. This effect is more significant, in particular, for lens systems having longer focal lengths.

In the case in which the first lens group G1 is formed in the foregoing manner, the lens system preferably satisfies conditional expression (6) and (7) given below:

$$2.0<f1a/f1<3.7 \tag{6}$$

$$1.0<f1b/f1<1.8 \tag{7}$$

where
 f1$a$: focal length of the first-a lens group,
 f1$b$: focal length of the first-b lens group, and
 f1: focal length of the first lens group.

If the lens system reaches or exceeds the upper limit of the conditional expression (6), the focal length of the first-a lens group G1a is increased, which leads to increase in refractive power of the first-b lens group G1b and the variation in aberrations due to focusing is increased. If the lens system falls to or below the lower limit of the conditional expression (6), the focal length of the first-b lens group is increased and the amount of movement of the first-b lens group G1b during focusing is increased, whereby the overall length of the lens system is increased. If the lens system reaches or exceeds the upper limit of the conditional expression (7), the focal length of the first-b lens group G1b is increased and the overall length of the lens system is increased. If the lens system falls to or below the lower limit of the conditional expression (7), the refractive power of the first-b lens group G1b is increased and the variation in aberrations due to focusing is increased. Satisfaction of the conditional expressions (6) and (7) is advantageous for overall length reduction of the lens system and suppression of the variation in aberrations upon focusing.

In order to further enhance the foregoing operational effects of the conditional expression (6), the lens system preferably satisfies a conditional expression (6-1) given below. In order to further enhance the foregoing operational effects of the conditional expression (7), the lens system preferably satisfies a conditional expression (7-1) given below:

$$2.2 < f1a/f1 < 3.3 \tag{6-1}$$

$$1.2 < f1b/f1 < 1.6. \tag{7-1}$$

Further, in the present zoom lens, the fourth lens group G4 is preferably composed essentially of a fourth-a lens group G4a having a positive refractive power, an aperture stop St, and a fourth-b lens group G4b in order from the object side. Disposition of the aperture stop St on the image side of the fourth-a lens group having a positive refractive power allows the aperture diameter to be reduced, thereby leading to downsizing of the mechanical structure.

In the case in which the fourth lens group G4 is configured in the foregoing manner, the lens system preferably satisfies conditional expressions (8) and (9) given below:

$$0.4 < f4a/f4 < 1.2 \tag{8}$$

$$-0.4 < f4/f4b < 0.6 \tag{9}$$

where f4a: focal length of the fourth-a lens group,
f4b: focal length of the fourth-b lens group, and
f4: focal length of the fourth lens group.

If the lens system reaches or exceeds the upper limit of the conditional expression (8), the refractive power of the fourth-a lens group G4a is reduced and it is difficult to reduce the aperture diameter. If the lens system falls to or below the lower limit of the conditional expression (8), the refractive power of the fourth-a lens group G4a is increased and spherical aberration and field curvature is aggravated. If the lens system reaches or exceeds the upper limit of the conditional expression (9), the positive refractive power of the fourth-b lens group G4b is increased which necessitates the reduction in the refractive power of the fourth-a lens group G4a for balancing, thereby causing difficulty in reducing the aperture diameter. If the lens system falls to or below the lower limit of the conditional expression (9), the negative refractive power of the fourth-b lens group G4b is increased which necessitates the increase in the refractive power of the fourth-a lens group G4a for balancing, thereby resulting in aggravation in spherical aberration and field curvature. Satisfaction of the conditional expressions (8) and (9) is advantageous for downsizing of the system and satisfactory correction of spherical aberration and field curvature.

In order to further enhance the foregoing operational effects of the conditional expression (8), the lens system preferably satisfies a conditional expression (8-1) given below. In order to further enhance the foregoing operational effects of the conditional expression (9), the lens system preferably satisfies a conditional expression (9-1) given below:

$$0.5 < f4a/f4 < 1.0 \tag{8-1}$$

$$-0.2 < f4/f4b < 0.45. \tag{9-1}$$

Still further, if the fourth lens group G4 is composed essentially of a fourth-a lens group G4a having a positive refractive power, an aperture stop St, and a fourth-b lens group G4b in order from the object side, a configuration may be adopted in which focusing in near view imaging is performed by moving a part of the fourth-b lens group. For example, the fourth-b lens group G4b may be composed essentially of a fourth-b1 lens group G4b1 having a negative refractive power and is fixed with respect to the image plane Sim upon focusing in near view imaging and a fourth-b2 lens group G4b2 having a positive refractive power and is moved in an optical axis direction upon focusing in near view imaging in order from the object side. Inclusion of a lens group which is moved upon focusing in near view imaging, aside from the focusing group which is moved upon focusing for ordinary imaging, allows a near view imaging mode, which is separate from the ordinary imaging mode, to be provided, whereby more proximal imaging may be performed.

In the case in which the fourth-b lens group G4b is composed of the fourth-b1 lens group G4b1 and the fourth-b2 lens group G4b2 in the foregoing manner, the lens system preferably satisfies a conditional expression (10) given below:

$$-0.1 < fw/fA < 0.1 \tag{10}$$

where fw: focal length of the entire system at the wide angle end, and fA: focal length of an optical system that combines the first lens group to the fourth-b1 lens group at the wide angle end.

If the lens system reaches or exceeds the upper limit of the conditional expression (10), the amount of movement of the fourth-b1 lens group G4b1 for switching to near view imaging mode is increased and the variation in aberrations is increased when switched to the near view imaging mode. If the lens system falls to or below the lower limit of the conditional expression (10), it is disadvantageous for the overall length reduction of the lens system. Satisfaction of the conditional expression (10) is advantageous for the suppression of the variation in aberrations during the near view imaging mode and the overall length reduction of the lens system.

Further, the second lens group G2 of the present zoom lens is composed essentially of a $21^{st}$ lens L21 with a concave surface on the image side, a $22^{nd}$ lens L22 having a positive refractive power with a convex surface on the image side, and a $23^{rd}$ lens L23 having a negative refractive power with a concave surface on the object side in order from the object side, and preferably satisfies a conditional expression (11) given below. Satisfaction of the conditional expression (11) allows lateral chromatic aberration, in particular, secondary chromatic aberration to be corrected satisfactorily.

$$vd22 < vd23 < 50 \tag{11}$$

where vd22: Abbe number of the $22^{nd}$ lens with respect to the d-line, and vd23: Abbe number of the $23^{th}$ lens with respect to the d-line.

Still further, the second lens group preferably includes at least one aspherical surface. Attempt to reduce the overall length of the lens system causes the power loads on the first lens group G1 and the second lens group G2 are increased and it is difficult to correct spherical aberration. It is, therefore, preferable to include an aspherical surface which is advantageous for aberration correction. In this case, it is advantageous for aberration correction to use the aspherical surface in the first lens group G1 in which the transmitted light beam is large in a telephoto system, but the use of the aspherical surface in the first lens group G1 is disadvantageous in terms of cost since the effective diameter of the first lens group G1 is large. The amount of movement of the second lens group G2 for image plane correction is small and the second lens group G2 is located near the first lens group G1, so that disposition of the aspherical surface in the second lens group G2 is most cost effective and realistic. In particular, the aspherical surface is preferably provided on the most object side surface of the second lens group G2, since the light beam is largest on the most object side surface in the second lens group G2.

Each lens group other than the second lens group G2 may take, for example, the following specific configurations. The first-a lens group G1a may be composed of a negative meniscus lens with a concave surface on the image side and a biconvex lens in order from the object side. The negative meniscus lens and the biconvex lens may be cemented or uncemented single lenses.

The first-b lens group may be composed of a negative meniscus lens with a concave surface on the image side, a positive lens with a convex surface on the object side, and a positive lens with a convex surface on the object side in order from the object side. Of these, the negative meniscus lens and the positive lens which are the first and the second lenses from the object side are preferably cemented.

The third lens group G3 may be composed of a negative lens with a concave surface on the image side, a positive meniscus lens with a convex surface on the object side, a biconcave lens, and a negative meniscus lens with a concave surface on the image side in order from the object side. Of these, the negative lens and the positive meniscus lens which are the first and the second lenses from the object side are preferably cemented. The biconcave lens and the negative meniscus lens which are the third and the fourth lenses from the object side are preferably cemented. The third lens group G3 may also be composed of a negative lens with a concave surface on the image side, a positive meniscus lens with a convex surface on the object side, and a biconcave lens in order from the object side.

The fourth-a lens G4a may be composed of a biconvex lens, a positive lens with a convex surface on the object side, a biconvex lens, and a biconcave lens in order from the object side. Of these, the biconvex lens and the biconcave lens which are the third and the fourth lenses from the object side are preferably cemented.

The fourth-b1 lens group G4b1 may be composed of a positive lens with a convex surface on the image side and a biconcave lens in order from the object side in order from the object side. If such is the case, the two lenses are preferably cemented. Alternatively, the fourth-b1 lens group G4b1 may be composed of only one negative meniscus lens with a concave surface on the image side.

The fourth-b2 lens group G4b2 may be composed, for example, of a biconvex lens, a negative lens with a concave surface on the object side, a biconvex lens, a biconcave lens, a biconvex lens in order from the object side. Of these, the biconvex lens and the biconcave lens which are the third and fourth lenses are preferably cemented.

The foregoing preferable configurations may be combined in any way, and are preferably employed selectively, as appropriate, according to the specifications required of the zoom lens. For example, appropriate employment of the preferable configurations allows a compact telephoto zoom lens with a total angle of view of about 21 degrees, a zoom ratio of about 3.5, and an overall length of the lens system of about 1.0 time of the focal length at the telephoto end to be realized.

Specific Examples of the zoom lens of the present invention will now be described.

EXAMPLE 1

Figure 2:
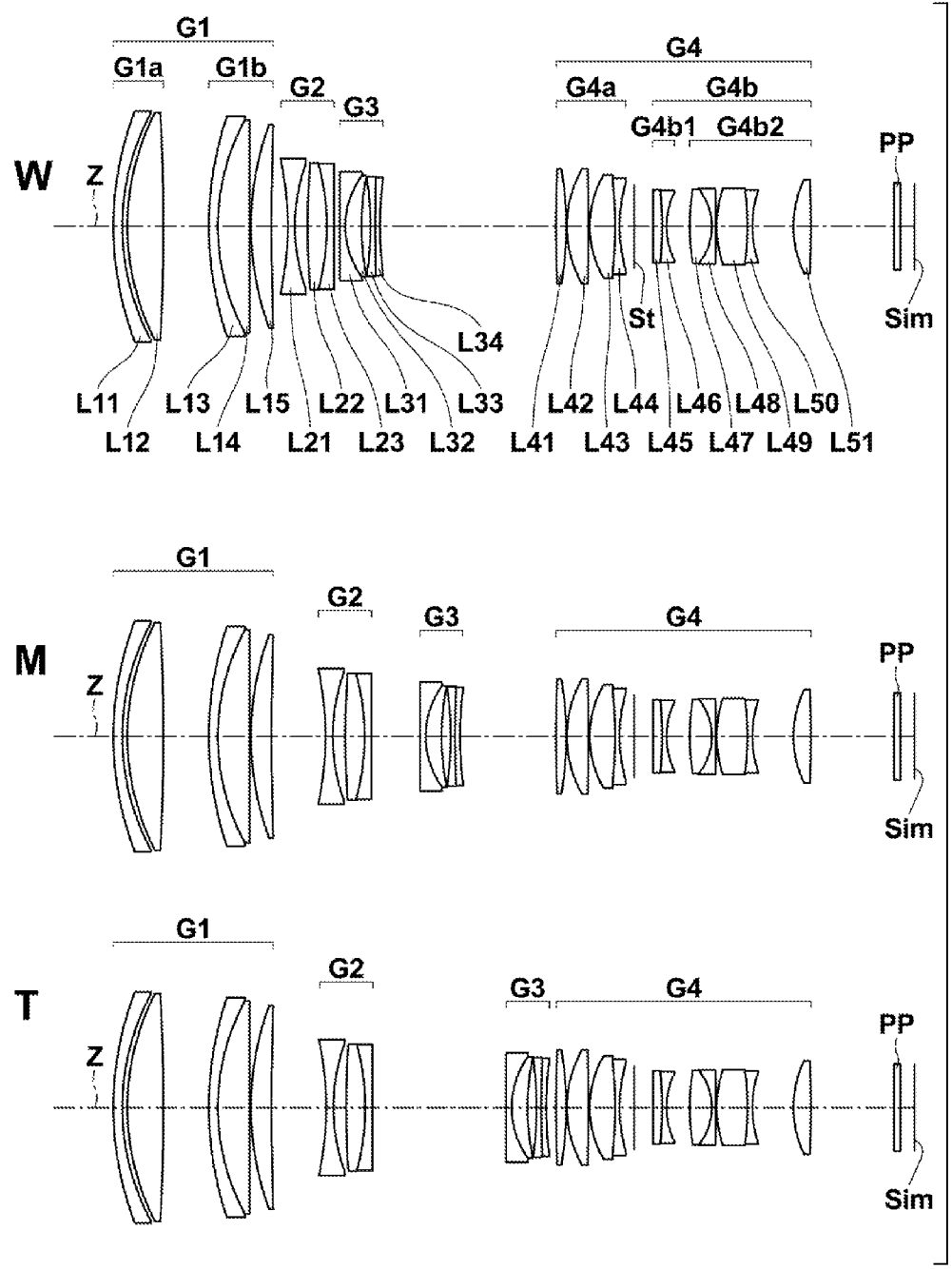
FIG. 2 is a cross-sectional view of a zoom lens of Example 1, illustrating the lens configuration thereof.

A cross-sectional view illustrating the configuration of a zoom lens of Example 1 is shown in FIG. 2. The disposition and the configuration of each lens group at the wide angle end, at the intermediate focal length state, and at the telephoto end are illustrated in the upper part, the middle part, and the lower part indicated, on the left, by the symbols W, M and T respectively.

The zoom lens of Example 1 is schematically configured in the following manner. That is, the zoom lens of Example 1 consists of a first lens group G1 having a positive refractive power, a second lens group G2 having a negative refractive power, a third lens group G3 having a negative refractive power, and a fourth lens group G4 having a positive refractive power, disposed in order from the object side. An aperture stop St is provided in the fourth lens group G4. Note that the aperture stop St shown in FIG. 2 is not necessarily represents the size or the shape but rather indicates the position on the optical axis Z. Further, FIG. 2 shows an example in which a parallel plate optical member PP, which assumes various types of filters, a cover glass, and the like, is disposed between the fourth lens group G4 and the image plane Sim.

The zoom lens is configured such that, upon zooming from the wide angle end to the telephoto end, the first lens group G1 and the fourth lens group G4 are fixed with respect to the image plane Sim, the third lens group G3 is moved monotonously from the object side to the image side along the optical axis, and the second lens group G2 is moved along the optical axis to correct an image plane variation associated with the zooming.

The first lens group G1 is composed of a first-a lens group G1a having a positive refractive power and is fixed with respect to the image plane Sim upon focusing and a first-b lens group G1b having a positive refractive power and is moved upon focusing in order from the object side. The first-a lens group G1a is composed of an $11^{th}$ lens L11 having a negative meniscus shape with a concave surface on the image side and a $12^{th}$ lens L12 having a biconvex shape in order from the object side. The first-b lens group G1b is composed of a $13^{th}$ lens L13 having a negative meniscus shape with concave surface on the image side, a positive $14^{th}$ lens L14 with a convex surface on the object side, and a positive $15^{th}$ lens L15 with a convex surface on the object side in order from the object side. The $13^{th}$ lens L13 and the $14^{th}$ lens L14 are cemented.

The second lens group G2 is composed of a $21^{st}$ lens having a biconcave shape in the paraxial region, a positive $22^{nd}$ lens L22 with a convex surface on the image side, and a negative $23^{th}$ lens L23 with a concave surface on the object side in order from the object side. The 22$^{nd}$ lens L22 and the 23$^{rd}$ lens L23 are cemented. In the entire system, an aspherical surface is provided only on the object side surface of the 21$^{st}$ lens L21.

The third lens group G3 is composed of a negative 31$^{st}$ lens L31 with a concave surface on the image side, a 32$^{nd}$ lens L32 having a positive meniscus shape with a convex surface on the object side, a 33$^{rd}$ lens L33 having a biconcave shape, and a 34$^{th}$ lens L34 having a negative meniscus shape with a concave surface on the image side in order from the object side. The 31$^{st}$ lens L31 and the 32$^{nd}$ lens L32 are cemented, and the 33$^{th}$ lens L33 and the 34$^{th}$ lens L34 are cemented.

The fourth lens group G4 is composed of a fourth-a lens group G4a having a positive refractive power, an aperture stop St, and a fourth-b lens group G4b in order from the object side. The fourth-b lens group is composed of a fourth-b1 lens group G4b1 having a negative refractive power and is fixed with respect to the image plane Sim upon focusing in near view imaging and a fourth-b2 lens group G4b2 having a positive refractive power and is moved upon focusing in near view imaging in order from the object side.

The fourth-a lens group G4a is composed of a 41$^{st}$ lens L41 having a biconvex shape, a positive 42$^{nd}$ lens L42 with a convex surface on the object side, a 43$^{th}$ lens L43 having a biconvex shape, and a 44$^{th}$ lens L44 having a biconcave shape in order from the object side. The 43$^{th}$ lens L43 and the 44$^{th}$ lens L44 are cemented.

The fourth-b1 lens group G4b1 is composed of a positive 45$^{th}$ lens L45 with a convex surface on the image side and a 46$^{th}$ lens L46 having a biconcave shape in order from the object side. The 45$^{th}$ lens L45 and the 46$^{th}$ lens L46 are cemented.

The fourth-b2 lens group G4b2 is composed of 47$^{th}$ lens L47 having a biconvex shape, a negative 48$^{th}$ lens L48 with a concave surface on the object side, a 49$^{th}$ lens L49 having a biconvex shape, a 50$^{th}$ lens L50 having a biconcave shape, and a 51$^{st}$ lens L51 having a biconvex shape. The 47$^{th}$ lens L47 and the 48$^{th}$ lens L48 are cemented, and 49$^{th}$ lens L49 and the 50$^{th}$ lens L50 are cemented.

Table 1 shows basic lens data of the zoom lens of Example 1. In Table 1, the Si column indicates i$^{th}$ surface number in which a number i (i=1, 2, 3, . . . . ) is given to each surface in a serially increasing manner toward the image side with the object side surface of the most object side constituent element being taken as the first surface. The Ri column indicates the radius of curvature of i$^{th}$ surface and the Di column indicates the surface distance between i$^{th}$ surface and (i+1)$^{th}$ surface on the optical axis Z. The Ndj column indicates the refractive index of j$^{th}$ optical element with respect to the d-line (wavelength 587.56 nm) in which a number j (j=1, 2, 3, . . . ) is given to each constituent element in a serially increasing manner toward the image side with the most object side constituent element being taken as the first element, and the vdj column indicates the Abbe number of j$^{th}$ optical element with respect to the d-line.

Note that the basic lens data include an aperture stop St and an optical member PP, and the surface number and the word (St) are indicated in the surface number column of the surface corresponding to the aperture stop St. The sign of the radius of curvature is positive if the surface shape is convex on the object side and negative if it is convex on the image side. Note that the numerical value at the bottom of the Di column indicates the distance between the image side surface of the optical member PP and the image plane Sim. Further, * mark is attached to the surface number of an aspherical surface and the value of paraxial radius of curvature is shown in the radius of curvature column of the aspherical surface.

Table 2 shows aspherical surface coefficients of the aspherical surface. The "E-n" (n: integer) in the values of aspherical surface coefficients represents "×10$_{-n}$". The aspherical surface coefficients represent values of coefficients KA and Am (m=3, 4, 5, . . . and 12) in the aspherical surface expression represented by the formula given below.

$$Zd = C \cdot h^2 / \{1 + (1 - KA \cdot C^2 \cdot h^2)^{1/2}\} + \Sigma Am \cdot h^m$$

where

Zd: depth of aspherical surface (length of vertical line extended from a point on the aspherical surface at height h to a flat surface orthogonal to the optical axis to which the aspherical apex contacts)

h: height (distance from the optical axis to the lens surface)

C: paraxial curvature

KA, Am: aspherical surface coefficients (m=3, 4, 5, and 12)

Table 3 shows specs and data related to zooming and focusing of the zoom lens of Example 1 at the wide angle end, in the intermediate focal length state, and at the telephoto end with respect to the d-line. The symbols f', Bf', FNo., and 2ω in Table 3 represent focal length of the entire system, back focus (air equivalent length), F-number, and total angle of view (in unit of degree) respectively.

Some of the surface distances are variable surface distances that change during zooming and/or focusing, and if the surface distance between the i$^{th}$ surface and (i+1)$^{th}$ surface is variable, it is note by DD[i] in the basic lens data of Table 1. The distance between the first lens group G1 and the second lens group G2, the distance between the second lens group G2 and the third lens group G3, the distance between the third lens group G3 and the fourth lens group G4 are variable surface distances that change during zooming, and correspond to DD[9], DD[14], DD[20] in Table 1 respectively. The distance between the first-a lens group G1a and the first-b lens group G1b, and the distance between the first-b lens group G1b and the second lens group G2 are variable surface distances that change during focusing, and correspond to DD[4] and DD[9] respectively. The distance between the fourth-b1 lens group G4b1 and the fourth-b2 lens group G4b2, and the distance between the fourth-b2 lens group G4b2 and the optical member PP are variable surface distances that change during focusing in near view imaging mode, and correspond to DD[31] and DD[39] in Table 1 respectively.

The second table of Table 3 shows the value of each variable surface distance when an object at infinity is in focus. The third table of Table 3 shows the values of DD[4] and DD[9] when an object at an object distance of 1.2 m is in focus. The fourth table of Table 3 shows the values of DD[31] and DD[39] when near view imaging is performed by moving the fourth-b2 lens group G4b2 from the state in which the object at the object distance 1.2 m is in focus and in-focus object distances at the wide angle end, in the intermediate focal length state, and at the telephoto end at that time respectively. The term "object distance" as used herein refers to the distance from the most object side lens surface to the object on the optical axis.

Tables 1 to 3 show values rounded to a predetermined digit. In Tables 1 to 3, length-related values without unit are in the unit of mm.

TABLE 1

Example 1 Basis Lens Data

| Si | Ri | Di | Ndj | vdj |
|---|---|---|---|---|
| 1 | 120.9976 | 3.20 | 1.80610 | 40.92 |
| 2 | 90.7917 | 1.83 | | |
| 3 | 94.5094 | 12.80 | 1.49700 | 81.54 |
| 4 | −800.4694 | DD[4] | | |
| 5 | 130.5301 | 3.20 | 1.80518 | 25.42 |

TABLE 1-continued

Example 1 Basis Lens Data

| Si | Ri | Di | Ndj | vdj |
|---|---|---|---|---|
| 6 | 84.8200 | 11.30 | 1.49700 | 81.54 |
| 7 | ∞ | 0.50 | | |
| 8 | 112.0085 | 7.30 | 1.49700 | 81.54 |
| 9 | 1039.2896 | DD[9] | | |
| *10 | −108.7987 | 2.50 | 1.51633 | 64.14 |
| 11 | 70.6204 | 4.58 | | |
| 12 | 325.2958 | 6.80 | 1.80518 | 25.43 |
| 13 | −89.8870 | 2.50 | 1.80610 | 33.27 |
| 14 | ∞ | DD[14] | | |
| 15 | ∞ | 2.00 | 1.69680 | 55.53 |
| 16 | 32.4830 | 5.70 | 1.80518 | 25.43 |
| 17 | 94.9821 | 3.24 | | |
| 18 | −125.2008 | 1.70 | 1.80400 | 46.58 |
| 19 | 628.8200 | 1.70 | 1.80518 | 25.42 |
| 20 | 140.7639 | DD[20] | | |
| 21 | 705.0040 | 3.60 | 1.71299 | 53.87 |
| 22 | −126.5753 | 0.20 | | |
| 23 | 44.3446 | 7.60 | 1.61800 | 63.33 |
| 24 | −1042.5633 | 0.52 | | |
| 25 | 39.0713 | 9.00 | 1.49700 | 81.54 |
| 26 | −181.8500 | 1.70 | 1.80000 | 29.84 |
| 27 | 62.7355 | 5.17 | | |
| 28 (St) | ∞ | 6.76 | | |
| 29 | ∞ | 3.20 | 1.80610 | 40.92 |
| 20 | −130.0200 | 1.50 | 1.80518 | 25.42 |
| 31 | 28.9905 | DD[31] | | |
| 32 | 86.9078 | 7.90 | 1.84666 | 23.88 |
| 33 | −22.0320 | 1.50 | 1.80400 | 46.58 |
| 34 | −355.2703 | 0.20 | | |
| 35 | 45.9098 | 11.00 | 1.49700 | 81.54 |
| 36 | −95.9100 | 1.70 | 1.80518 | 25.42 |
| 37 | 42.2855 | 14.63 | | |
| 38 | 40.8148 | 6.30 | 1.51633 | 64.14 |
| 39 | −314.6444 | DD[39] | | |
| 40 | ∞ | 2.30 | 1.51633 | 64.14 |
| 41 | ∞ | 5.03 | | |

TABLE 2

Example 1 Aspherical Coeffcient

| Si | 10 |
|---|---|
| KA | −8.7165474E+00 |
| A3 | 0.0000000E+00 |
| A4 | 4.0824795E−09 |
| A5 | −1.7722885E−08 |
| A6 | 1.6079644E−09 |
| A7 | −4.3607205E−11 |
| A8 | −1.2227806E−12 |
| A9 | 1.0947532E−13 |
| A10 | −1.6421612E−15 |
| A11 | −3.8208402E−17 |
| A12 | 9.7106795E−19 |

TABLE 3

Example 1 Specs & Data Related to Zooming and Focusing

| | Wide | Intermediate | Telephoto |
|---|---|---|---|
| Specs (d-Line) | | | |
| Zoom Ratio | 1.0 | 2.0 | 3.4 |
| f | 86.56 | 173.12 | 295.17 |
| Bf | 36.13 | 36.13 | 36.13 |
| FNo. | 2.70 | 2.70 | 3.72 |
| 2ω[°] | 21.2 | 10.4 | 6.0 |
| Variable Surface Distance (Object Distance = Infinity) | | | |
| DD[4] | 16.22 | 16.22 | 16.22 |
| DD[9] | 5.85 | 19.29 | 19.55 |
| DD[14] | 2.10 | 17.28 | 47.71 |
| DD[20] | 62.90 | 34.27 | 3.58 |
| DD[31] | 8.34 | 8.34 | 8.34 |
| DD[39] | 29.58 | 29.58 | 29.58 |
| Variable Surface Distance (Object Distance = 1.2 m) | | | |
| DD[4] | 4.92 | 4.92 | 4.92 |
| DD[9] | 17.15 | 30.59 | 30.85 |
| In-Focus Object Distance in Near View Imaging (DD[31] = 3.34, DD[39] = 34.58) | | | |
| In-Focus Object Distance | 0.672 m | 1.013 m | 1.130 m |

A to D of FIG. 7 are aberration diagrams of spherical aberration, astigmatism, distortion and lateral chromatic aberration of the zoom lens of Example 1 at the wide angle end. E to H of FIG. 7 are aberration diagrams of spherical aberration, astigmatism, distortion and lateral chromatic aberration of the zoom lens of Example 1 in the intermediate focal length state. I to L of FIG. 7 are aberration diagrams of spherical aberration, astigmatism, distortion and lateral chromatic aberration of the zoom lens of Example 1 at the telephoto end. A to L of FIG. 7 are those when an object at infinity is in focus.

Each aberration diagram shows aberration with the d-line (wavelength 587.56 nm) as the reference wave length, but the spherical aberration diagram also illustrates aberrations with respect to the C-line (wavelength 656.27 nm) and the F-line (wavelength 486.13 nm). The lateral chromatic aberration diagram illustrates aberrations with respect to the C-line and the F-line. In the astigmatism diagram, the solid line illustrates astigmatism in the sagittal direction while the dotted line illustrates astigmatism in the tangential direction and the notes of line types include symbols (S) and (T) respectively. The "FNo." in the spherical aberration diagram represents the F-number and "ω" in the other aberration diagrams represents the half angle of view.

The each symbol in the data, its meaning, representation method, and the like described in Example 1 are applied also to the following examples unless otherwise specifically described, and duplicated description will be omitted herein below.

EXAMPLE 2

Figure 3:
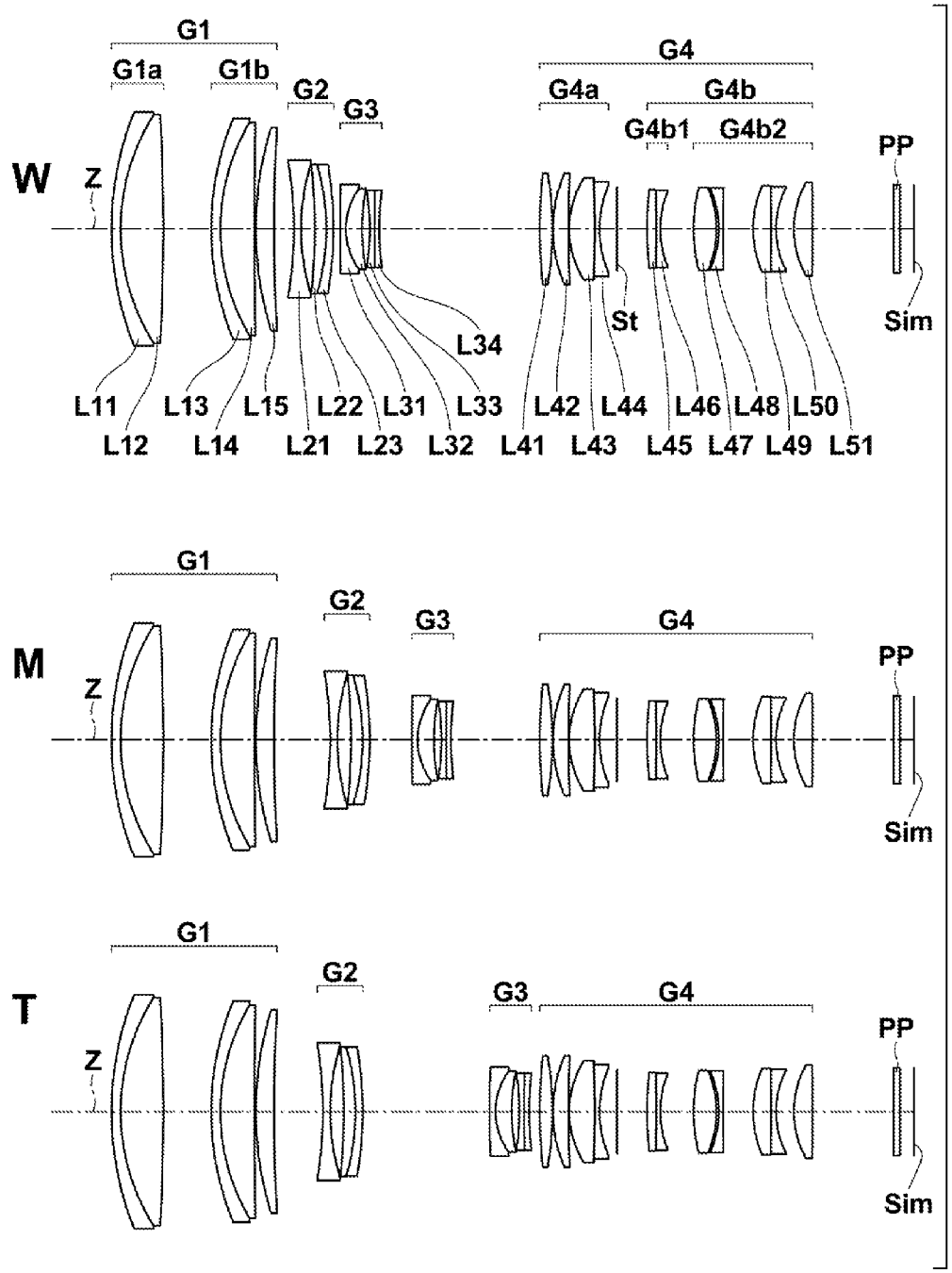
FIG. 3 is a cross-sectional view of a zoom lens of Example 2, illustrating the lens configuration thereof.

The lens configuration of the zoom lens of Example 2 is shown in FIG. 3. The schematic configuration of the zoom lens of Example 2 is roughly identical to that of the zoom lens of Example 1 described above, but differs in that the 11$^{th}$ lens L11 and the 12$^{th}$ lens L12 are cemented, and the 47$^{th}$ lens L47 and the 48$^{th}$ lens L48 are not cemented. Tables 4, 5, and 6 show basic lens data, aspherical surface coefficients, specs and data related to zooming and focusing of the zoom lens of Example 2 respectively. A to L of FIG. 8 are respective aberration diagrams of the zoom lens of Example 2.

TABLE 4

Example 2 Basic Lens Data

| Si | Ri | Di | Ndj | v dj |
|---|---|---|---|---|
| 1 | 117.4272 | 3.20 | 1.80610 | 40.92 |
| 2 | 80.0239 | 15.00 | 1.49700 | 81.54 |
| 3 | −823.3627 | DD[3] | | |

TABLE 4-continued

Example 2 Basic Lens Data

| Si | Ri | Di | Ndj | νdj |
|---|---|---|---|---|
| 4 | 108.8743 | 3.20 | 1.80518 | 25.42 |
| 5 | 78.4120 | 12.00 | 1.49700 | 81.54 |
| 6 | 2771.2664 | 0.50 | | |
| 7 | 130.2209 | 6.41 | 1.49700 | 81.54 |
| 8 | 705.3472 | DD[8] | | |
| *9 | −141.3861 | 2.50 | 1.51633 | 64.14 |
| 10 | 83.3869 | 4.79 | | |
| 11 | −234.2289 | 4.11 | 1.80518 | 25.43 |
| 12 | −84.8614 | 2.50 | 1.80610 | 40.92 |
| 13 | −142.2027 | DD[13] | | |
| 14 | 790.3325 | 2.00 | 1.69680 | 55.53 |
| 15 | 25.7309 | 5.69 | 1.80518 | 25.43 |
| 16 | 73.8679 | 2.71 | | |
| 17 | −93.5415 | 1.70 | 1.80400 | 46.58 |
| 18 | 775.3039 | 1.70 | 1.80518 | 25.42 |
| 19 | 113.6549 | DD[19] | | |
| 20 | 193.0060 | 4.46 | 1.71299 | 53.87 |
| 21 | −117.3332 | 0.20 | | |
| 22 | 53.3973 | 5.49 | 1.61800 | 63.33 |
| 23 | 419.9389 | 0.20 | | |
| 24 | 35.8190 | 9.00 | 1.49700 | 81.54 |
| 25 | −365.2507 | 1.70 | 1.80000 | 29.84 |
| 26 | 41.7871 | 6.15 | | |
| 27 (St) | ∞ | 10.62 | | |
| 28 | 161.0350 | 3.16 | 1.80610 | 40.92 |
| 29 | −1832.3813 | 1.50 | 1.80518 | 25.42 |
| 30 | 37.5034 | DD[30] | | |
| 31 | 63.0027 | 8.05 | 1.84666 | 23.88 |
| 32 | −39.0282 | 0.83 | | |
| 33 | −36.8004 | 1.50 | 1.80400 | 46.58 |
| 34 | 815.5350 | 10.59 | | |
| 35 | 40.2061 | 6.34 | 1.49700 | 81.54 |
| 36 | −1859.0564 | 1.70 | 1.80518 | 25.42 |
| 37 | 33.4339 | 6.31 | | |
| 38 | 35.6016 | 6.63 | 1.51633 | 64.14 |
| 39 | −1155.0310 | DD[39] | | |
| 40 | ∞ | 2.30 | 1.51633 | 64.14 |
| 41 | ∞ | 5.02 | | |

TABLE 5

Example 2 Aspherical Coefficient

| Si | 9 |
|---|---|
| KA | −5.0000000E+01 |
| A3 | 0.0000000E+00 |
| A4 | −1.9075808E−06 |
| A5 | 1.3186550E−08 |
| A6 | 1.4137719E−09 |
| A7 | 2.6952829E−11 |
| A8 | −1.6964901E−12 |
| A9 | −4.6556068E−14 |
| A10 | −3.1571320E−16 |
| A11 | 1.5831165E−16 |
| A12 | −3.0952463E−18 |

TABLE 6

Example 1 Specs & Data Related to Zooming and Focusing

| | Wide | Intermediate | Telephoto |
|---|---|---|---|
| Specs (d-Line) | | | |
| Zoom Ratio | 1.0 | 2.0 | 3.4 |
| f | 86.53 | 173.07 | 295.08 |
| Bf | 34.95 | 34.95 | 34.95 |
| FNo. | 2.70 | 2.88 | 3.78 |
| 2ω[°] | 21.2 | 10.4 | 6.0 |

TABLE 6-continued

Example 1 Specs & Data Related to Zooming and Focusing

| | Wide | Intermediate | Telephoto |
|---|---|---|---|
| Variable Surface Distance (Object Distance = Infinity) | | | |
| DD[3] | 16.93 | 16.93 | 16.93 |
| DD[8] | 7.00 | 19.77 | 17.27 |
| DD[13] | 2.38 | 14.90 | 44.94 |
| DD[19] | 56.61 | 31.31 | 3.79 |
| DD[30] | 11.68 | 11.68 | 11.68 |
| DD[39] | 28.41 | 28.41 | 28.41 |
| Variable Surface Distance (Object Distance = 1.2 m) | | | |
| DD[3] | 5.19 | 5.19 | 5.19 |
| DD[8] | 18.74 | 31.51 | 29.01 |
| In-Focus Object Distance in Near View Imaging (DD[30] = 6.68, DD[39] = 33.41) | | | |
| In-Focus Object Distance | 0.672 m | 1.014 m | 1.130 m |

EXAMPLE 3

Figure 4:
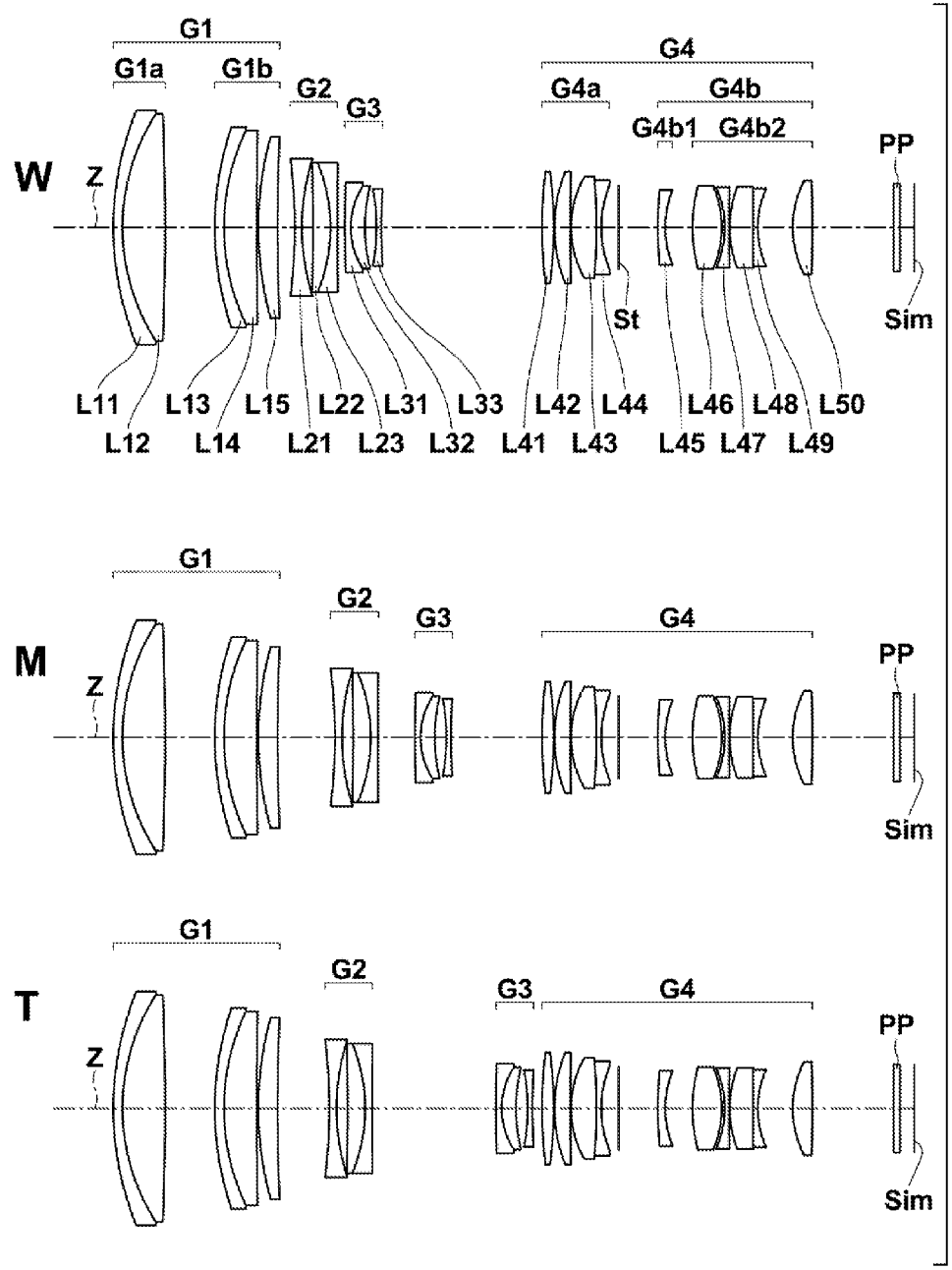
FIG. 4 is a cross-sectional view of a zoom lens of Example 3, illustrating the lens configuration thereof.

The lens configuration of the zoom lens of Example 3 is shown in FIG. 4. The schematic configuration of the zoom lens of Example 3 is roughly identical to that of the zoom lens of Example 2, but differs in that it does not include the 34$^{th}$ lens L34 and configurations of the fourth-b1 lens group G4b1 and fourth-b2 lens group G42b. The fourth-b1 lens group G4b1 of the zoom lens of Example 3 is composed of only a 45$^{th}$ lens L45 having a negative meniscus shape with a concave surface on the image side. The fourth-b2 lens group G4b2 of the zoom lens of Example 3 is composed of a 46$^{th}$ lens L46 having a biconvex shape, a 47$^{th}$ lens L47 having a biconcave shape, a 48$^{th}$ lens L48 having a biconvex shape, a 49$^{th}$ lens L49 having a biconcave shape, and a 50$^{th}$ lens L50 having a biconvex shape in order from the object side. The 48$^{th}$ lens L48 and the 49$^{th}$ lens L49 are cemented.

Tables 7, 8 and 9 show basic lens data, aspherical surface coefficients, specs and data related to zooming and focusing of the zoom lens of Example 3 respectively. A to L of FIG. 9 are respective aberration diagrams of the zoom lens of Example 3.

TABLE 7

Example 3 Basic Lens Data

| Si | Ri | Di | Ndj | νdj |
|---|---|---|---|---|
| 1 | 115.2238 | 3.20 | 1.80610 | 40.92 |
| 2 | 78.1021 | 15.00 | 1.49700 | 81.54 |
| 3 | −1062.4336 | DD[3] | | |
| 4 | 116.1569 | 3.20 | 1.80518 | 25.42 |
| 5 | 83.9701 | 11.61 | 1.49700 | 81.54 |
| 6 | 3809.4857 | 0.50 | | |
| 7 | 126.7708 | 6.79 | 1.49700 | 81.54 |
| 8 | 792.2425 | DD[8] | | |
| *9 | −198.1716 | 2.50 | 1.51633 | 64.14 |
| 10 | 85.0071 | 3.94 | | |
| 11 | −734.9383 | 6.14 | 1.80518 | 25.42 |
| 12 | −62.7447 | 2.50 | 1.67270 | 32.10 |
| 13 | 4589.3780 | DD[13] | | |
| 14 | 534.0935 | 2.00 | 1.69680 | 55.53 |
| 15 | 28.4821 | 5.01 | 1.80518 | 25.42 |
| 16 | 63.1974 | 4.06 | | |
| 17 | −80.3434 | 1.70 | 1.80400 | 46.58 |
| 18 | 214.3310 | DD[18] | | |
| 19 | 173.7754 | 4.15 | 1.71299 | 53.87 |
| 20 | −153.2429 | 0.20 | | |
| 21 | 55.7735 | 5.63 | 1.71299 | 53.87 |
| 22 | 1258.0362 | 0.20 | | |

TABLE 7-continued

Example 3 Basic Lens Data

| Si | Ri | Di | Ndj | v dj |
|---|---|---|---|---|
| 23 | 38.2619 | 9.00 | 1.49700 | 81.54 |
| 24 | −191.3425 | 1.70 | 1.80000 | 29.84 |
| 25 | 42.1811 | 6.18 | | |
| 26 (St) | ∞ | 13.69 | | |
| 27 | 147.2817 | 2.62 | 1.80518 | 25.42 |
| 28 | 37.6155 | DD[28] | | |
| 29 | 58.3242 | 10.27 | 1.84139 | 24.56 |
| 30 | −39.0751 | 1.09 | | |
| 31 | −36.1296 | 1.50 | 1.80400 | 46.58 |
| 32 | 1285.3252 | 0.20 | | |
| 33 | 41.7666 | 8.24 | 1.49700 | 81.54 |
| 34 | −12319.0027 | 1.70 | 1.84666 | 23.78 |
| 35 | 35.7876 | 12.26 | | |
| 36 | 38.3322 | 6.93 | 1.48749 | 70.23 |
| 37 | −441.1128 | DD[37] | | |
| 38 | ∞ | 2.30 | 1.51633 | 64.14 |
| 39 | ∞ | 5.06 | | |

TABLE 8

Example 3 Aspherical Coefficient

| Si | 9 |
|---|---|
| KA | −1.4783606E+02 |
| A3 | 0.0000000E+00 |
| A4 | −2.3436467E−06 |
| A5 | 2.4106442E−08 |
| A6 | 2.0839905E−09 |
| A7 | 1.9496850E−11 |
| A8 | −2.6626023E−12 |
| A9 | −6.1340985E−14 |
| A10 | 4.5217422E−16 |
| A11 | 2.0648197E−16 |
| A12 | −4.3936729E−18 |

TABLE 9

Example 3 Specs & Data Related to Zooming and Focusing

| | Wide | Intermediate | Telephoto |
|---|---|---|---|
| Specs (d-Line) | | | |
| Zoom Ratio | 1.0 | 2.0 | 3.5 |
| f | 85.06 | 170.12 | 300.26 |
| Bf | 35.07 | 35.07 | 35.07 |
| FNo. | 2.70 | 2.83 | 3.78 |
| 2ω[°] | 21.4 | 10.6 | 6.0 |
| Variable Surface Distance (Object Distance = Infinity) | | | |
| DD[3] | 17.50 | 17.50 | 17.50 |
| DD[8] | 6.03 | 20.16 | 18.23 |
| DD[13] | 2.60 | 13.05 | 43.63 |
| DD[18] | 56.63 | 32.05 | 3.40 |
| DD[28] | 9.57 | 9.57 | 9.57 |
| DD[37] | 28.50 | 28.50 | 28.50 |
| Variable Surface Distance (Object Distance = 1.2 m) | | | |
| DD[3] | 5.60 | 5.60 | 5.60 |
| DD[8] | 17.93 | 32.06 | 30.13 |
| In-Focus Object Distance in Near View Imaging (DD[28] = 4.57, DD[37] = 33.50) | | | |
| In-Focus Object Distance | 0.660 m | 1.008 m | 1.133 m |

EXAMPLE 4

Figure 5:
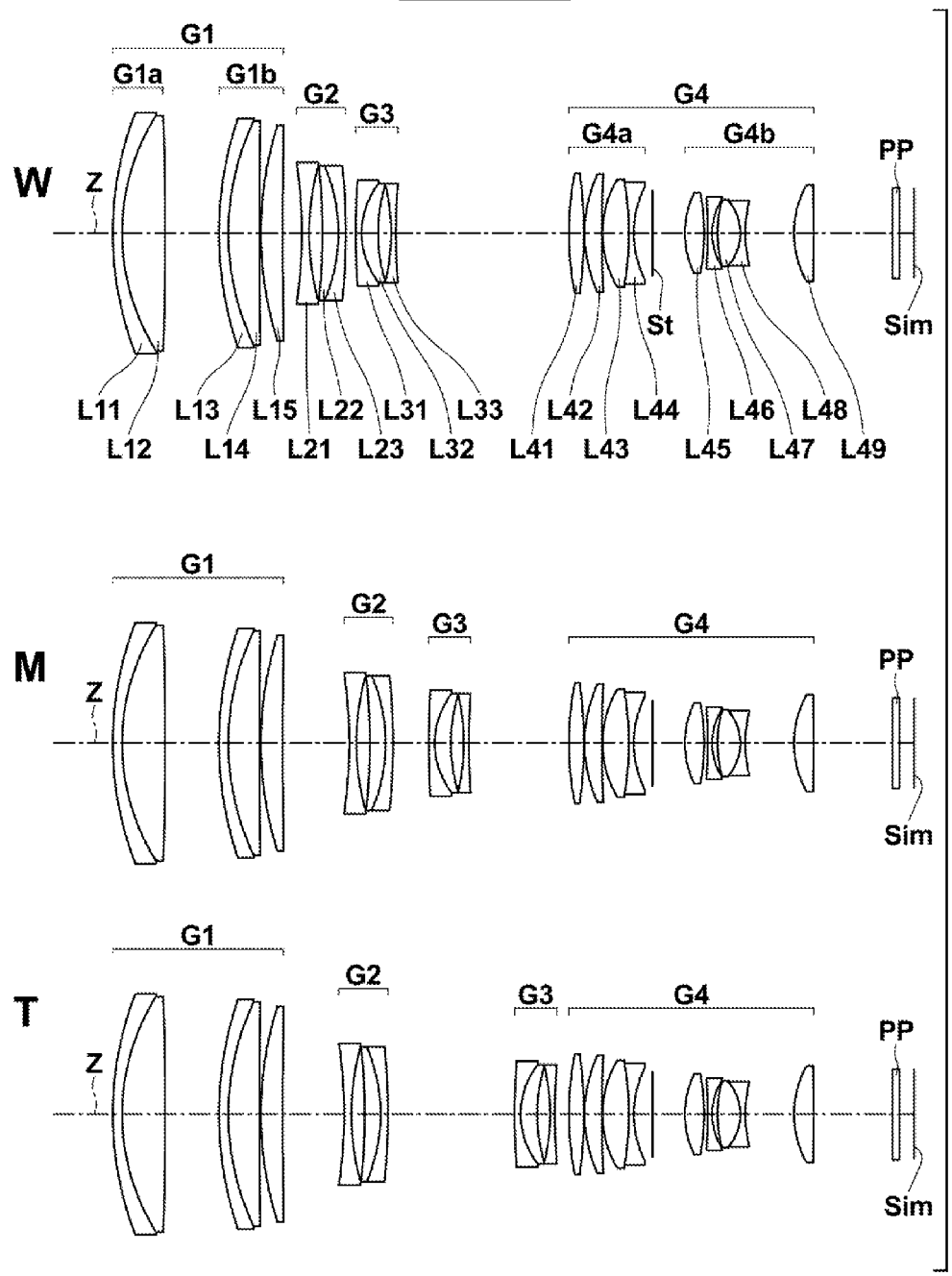
FIG. 5 is a cross-sectional view of a zoom lens of Example 4, illustrating the lens configuration thereof.

The lens configuration of the zoom lens of Example 4 is shown in FIG. 5. The schematic configuration of the zoom lens of Example 4 is roughly identical to that of the zoom lens of Example 3, but differs in that it does not include the near view imaging mode. The fourth-b lens group G4b of the zoom lens of Example 4 is composed of a $45^{th}$ lens L45 having a biconvex shape, a $46^{th}$ lens L46 having a biconvex shape, a $47^{th}$ lens L47 having a biconvex shape, a $48^{th}$ lens L48 having a biconcave shape, and a $49^{th}$ lens L49 having a biconvex shape in order from the object side. The $47^{th}$ lens L47 and the $48^{th}$ lens L48 are cemented.

Tables 10, 11 and 12 show basic lens data, aspherical surface coefficients, specs and data related to zooming and focusing of the zoom lens of Example 4 respectively. A to L of FIG. 10 are respective aberration diagrams of the zoom lens of Example 4.

TABLE 10

Example 4 Basic Lens Data

| Si | Ri | Di | Ndj | v dj |
|---|---|---|---|---|
| 1 | 120.5572 | 3.20 | 1.80610 | 40.92 |
| 2 | 80.0093 | 14.72 | 1.49700 | 81.54 |
| 3 | −1306.8915 | DD[3] | | |
| 4 | 130.6588 | 3.20 | 1.80518 | 25.42 |
| 5 | 94.3314 | 10.65 | 1.49700 | 81.54 |
| 6 | 2756.5549 | 0.50 | | |
| 7 | 131.9363 | 7.41 | 1.49700 | 81.54 |
| 8 | 2885.0637 | DD[8] | | |
| *9 | −170.5620 | 2.50 | 1.51633 | 64.14 |
| 10 | 91.5737 | 4.55 | | |
| 11 | −228.6605 | 5.43 | 1.80518 | 25.42 |
| 12 | −61.7594 | 2.50 | 1.67270 | 32.10 |
| 13 | −243.5383 | DD[13] | | |
| 14 | 291.5791 | 2.00 | 1.69680 | 55.53 |
| 15 | 29.0372 | 5.62 | 1.80518 | 25.42 |
| 16 | 60.1294 | 4.42 | | |
| 17 | −77.0393 | 1.70 | 1.80400 | 46.58 |
| 18 | 263.9453 | DD[18] | | |
| 19 | 111.2150 | 5.13 | 1.69680 | 55.53 |
| 20 | −155.0429 | 0.20 | | |
| 21 | 51.6076 | 5.92 | 1.69680 | 55.53 |
| 22 | 479.6390 | 0.20 | | |
| 23 | 38.1466 | 9.00 | 1.49700 | 81.54 |
| 24 | −114.3058 | 1.70 | 1.80610 | 33.27 |
| 25 | 37.6978 | 6.43 | | |
| 26 (St) | ∞ | 11.01 | | |
| 27 | 33.6018 | 6.60 | 1.58144 | 40.75 |
| 28 | −77.9953 | 1.20 | | |
| 29 | −170.9721 | 1.50 | 1.80518 | 25.42 |
| 30 | 22.7895 | 1.87 | | |
| 31 | 45.4007 | 7.78 | 1.75520 | 27.51 |
| 32 | −18.1294 | 1.70 | 1.80610 | 40.92 |
| 33 | 47.5928 | 16.66 | | |
| 34 | 36.4050 | 6.70 | 1.51633 | 64.14 |
| 35 | −546.4619 | 26.95 | | |
| 36 | ∞ | 2.30 | 1.51633 | 64.14 |
| 37 | ∞ | 5.05 | | |

TABLE 11

Example 4 Aspherical Coefficient

| Si | 9 |
|---|---|
| KA | −9.9843831E+01 |
| A3 | 0.0000000E+00 |
| A4 | −2.4079756E−06 |
| A5 | 2.0337575E−08 |
| A6 | 2.2147906E−09 |
| A7 | 2.1791810E−11 |
| A8 | −2.7215092E−12 |
| A9 | −6.3541311E−14 |
| A10 | 4.9990915E−16 |
| A11 | 2.1071199E−16 |
| A12 | −4.5305086E−10 |

TABLE 12

Example 4 Specs & Data Related to Zooming and Focusing

| | Wide | Intermediate | Telephoto |
|---|---|---|---|
| Specs (d-Line) | | | |
| Zoom Ratio | 1.0 | 2.0 | 3.5 |
| f | 85.05 | 170.09 | 300.21 |
| Bf | 33.51 | 33.51 | 33.51 |
| FNo. | 2.70 | 2.70 | 3.77 |
| 2ω[°] | 21.6 | 10.6 | 6.0 |
| Variable Surface Distance (Object Distance = Infinity) | | | |
| DD[3] | 18.36 | 18.36 | 18.36 |
| DD[8] | 6.55 | 22.70 | 20.98 |
| DD[13] | 3.44 | 12.24 | 43.39 |
| DD[18] | 59.15 | 34.20 | 4.77 |
| Variable Surface Distance (Object Distance = 1.2 m) | | | |
| DD[3] | 5.55 | 5.55 | 5.55 |
| DD[8] | 19.36 | 35.51 | 33.79 |

EXAMPLE 5

Figure 6:
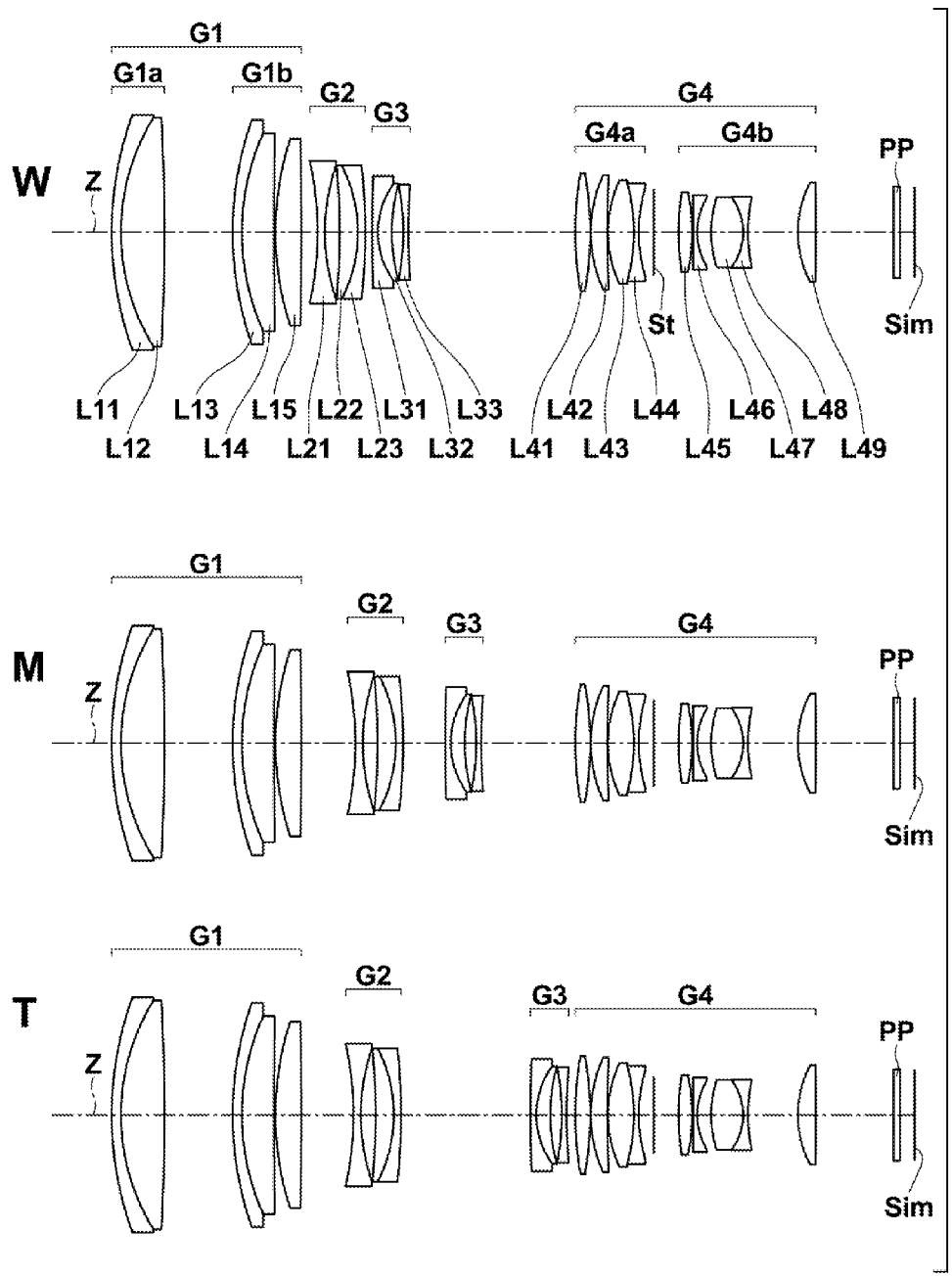
FIG. 6 is a cross-sectional view of a zoom lens of Example 5, illustrating the lens configuration thereof.

The lens configuration of the zoom lens of Example 5 is shown in FIG. 6. The schematic configuration of the zoom lens of Example 5 is roughly identical to that of the zoom lens of Example 4. Tables 13, 14 and 15 show basic lens data, aspherical surface coefficients, specs and data related to zooming and focusing of the zoom lens of Example 5 respectively. A to L of FIG. 11 are respective aberration diagrams of the zoom lens of Example 5.

TABLE 13

Example 5 Basic Lens Data

| Si | Ri | Di | Ndj | ν dj |
|---|---|---|---|---|
| 1 | 126.6565 | 3.20 | 1.80610 | 40.92 |
| 2 | 80.0446 | 15.00 | 1.49700 | 81.54 |
| 3 | −819.4663 | DD[3] | | |
| 4 | 124.9730 | 3.20 | 1.80518 | 25.42 |
| 5 | 88.6055 | 11.09 | 1.49700 | 81.54 |
| 6 | 3326.3024 | 0.50 | | |
| 7 | 111.1353 | 8.96 | 1.49700 | 81.54 |
| 8 | −1851.8881 | DD[8] | | |
| *9 | −111.3108 | 2.50 | 1.51633 | 64.14 |
| 10 | 75.5822 | 5.10 | | |
| 11 | −249.4503 | 6.34 | 1.80518 | 25.42 |
| 12 | −53.1900 | 2.50 | 1.67270 | 32.10 |
| 13 | −224.6834 | DD[13] | | |
| 14 | 570.3478 | 2.00 | 1.69680 | 55.53 |
| 15 | 30.4677 | 4.85 | 1.80518 | 25.42 |
| 16 | 67.5947 | 3.96 | | |
| 17 | −87.5197 | 1.70 | 1.80400 | 46.58 |
| 18 | 221.8103 | DD[18] | | |
| 19 | 123.6653 | 5.17 | 1.69680 | 55.53 |
| 20 | −122.2231 | 0.20 | | |
| 21 | 51.0461 | 5.72 | 1.69680 | 55.53 |
| 22 | 438.7630 | 0.20 | | |
| 23 | 44.7950 | 9.00 | 1.49700 | 81.54 |
| 24 | −67.1466 | 1.70 | 1.80610 | 33.27 |
| 25 | 57.7632 | 5.19 | | |
| 26 (St) | ∞ | 8.60 | | |
| 27 | 96.6742 | 4.65 | 1.80518 | 25.42 |
| 28 | −71.7566 | 0.27 | | |
| 29 | −1385.6667 | 1.50 | 1.80518 | 25.42 |
| 30 | 24.8402 | 4.84 | | |
| 31 | 42.9357 | 11.02 | 1.64769 | 33.79 |
| 32 | −21.4586 | 1.70 | 1.80610 | 40.92 |
| 33 | 61.2464 | 17.23 | | |
| 34 | 38.7952 | 6.26 | 1.51633 | 64.14 |
| 35 | −727.9122 | 26.80 | | |
| 36 | ∞ | 2.30 | 1.51633 | 64.14 |
| 37 | ∞ | 5.04 | | |

TABLE 14

Example 5 Aspherical Coefficient

| Si | 9 |
|---|---|
| KA | −1.7890840E+01 |
| A3 | 0.0000000E+00 |
| A4 | −1.1190620E−06 |
| A5 | −6.1560835E−10 |
| A6 | 7.7734376E−10 |
| A7 | 2.8832307E−11 |
| A8 | −8.3740814E−13 |
| A9 | −6.2654221E−14 |
| A10 | 5.6564295E−17 |
| A11 | 1.4858024E−16 |
| A12 | −3.1209113E−18 |

TABLE 15

Example 5 Specs & Data Related to Zooming and Focusing

| | Wide | Intermediate | Telephoto |
|---|---|---|---|
| Specs (d-Line) | | | |
| Zoom Ratio | 1.0 | 2.0 | 3.5 |
| f | 85.03 | 170.07 | 300.17 |
| Bf | 33.35 | 33.35 | 33.35 |
| FNo. | 2.70 | 2.70 | 3.67 |
| 2ω[°] | 21.8 | 10.6 | 6.0 |
| Variable Surface Distance (Object Distance = Infinity) | | | |
| DD[3] | 23.65 | 23.65 | 23.65 |
| DD[8] | 5.66 | 18.75 | 18.08 |
| DD[13] | 2.39 | 14.58 | 44.84 |
| DD[18] | 57.85 | 32.57 | 2.98 |
| Variable Surface Distance (Object Distance = 1.2 m) | | | |
| DD[3] | 13.38 | 13.38 | 13.38 |
| DD[8] | 15.93 | 29.02 | 28.35 |

Table 16 shows values corresponding to the conditional expressions (1) to (10) and values related to the conditional expression (11) with respect to Examples 1 to 5 described above. When the overall length of the lens system is taken as TTL and the focal length of the entire system at the telephoto end is taken as ft, Table 16 also shows values of TTL/ft. Note that the values shown in Table 16 are those with respect to the d-line.

TABLE 16

| Conditional Expression | | Example 1 | Example 2 | Example 3 | Example 4 | Example 5 |
|---|---|---|---|---|---|---|
| (1) | M2/M3 | 0.23 | 0.19 | 0.23 | 0.27 | 0.23 |
| (2) | \|f2/fw\| | 1.22 | 1.59 | 1.52 | 1.67 | 1.34 |
| (3) | \|f3/fw\| | 0.66 | 0.54 | 0.55 | 0.57 | 0.59 |
| (4) | f1/fw | 1.23 | 1.25 | 1.28 | 1.34 | 1.22 |
| (5) | f4/fw | 0.83 | 0.79 | 0.81 | 0.76 | 0.75 |
| (6) | f1a/f1 | 2.54 | 2.55 | 2.59 | 2.71 | 3.07 |
| (7) | f1b/f1 | 1.46 | 1.46 | 1.44 | 1.41 | 1.29 |
| (8) | f4a/f4 | 0.61 | 0.78 | 0.78 | 0.85 | 0.76 |
| (9) | f4/f4b | −0.08 | 0.29 | 0.33 | 0.20 | 0.05 |
| (10) | fw/fA | −0.01 | −0.01 | −0.01 | | |
| (11) | ν d22 | 25.43 | 25.43 | 25.42 | 25.42 | 25.42 |
| | ν d23 | 33.27 | 40.92 | 32.10 | 32.10 | 32.10 |
| | TTL/ft | 0.97 | 0.96 | 0.94 | 0.91 | 0.93 |

From the foregoing data, it is known that, in telephoto systems with zoom ratios of 3.4 to 3.5, the zoom lenses of Example 1 to 5 have achieved downsizing in which the overall length of the lens system is less than or equal to 1.0 time of the focal length at the telephoto end, while maintaining favorable optical performance.

Next, an imaging apparatus according to an embodiment of the present invention will be described with reference to FIG. 12. As an example of imaging apparatus according to an embodiment of the present invention, a schematic configuration diagram of an imaging apparatus 10 that uses a zoom lens 1 of an embodiment of the present invention is shown in FIG. 12. As for the imaging apparatus, for example, a film camera, or an electronic camera, such as, a digital camera, a video camera, a broadcasting camera, a motion picture camera, a surveillance camera, or the like may be cited.

The imaging apparatus 10 illustrated in FIG. 12 includes the zoom lens 1, a filter 2 disposed on the image side of the zoom lens 1, an image sensor 3 that captures an image of a subject formed by the zoom lens 1, a signal processing unit 4 that performs an arithmetic operation on the output signal from the image sensor 3, a zoom control unit 5, and a focus control unit 6. The zoom lens 1 has a first lens group G1 having a positive refractive power, a second lens group having a negative refractive power, a third lens group having a negative refractive power, and a fourth lens group having a positive refractive power. Note that each lens group is schematically illustrated in FIG. 12.

The image sensor 3 outputs an electrical signal by capturing an optical image formed by the zoom lens 1 and is disposed such that the imaging surface thereof corresponds to the image plane. As for the image sensor 3, for example, a CCD (Charge Coupled Device), a CMOS (Complementary Metal Oxide Semiconductor), or the like may be used. The zoom control unit 5 performs zooming by moving the third lens group G3 in an optical axis direction and moves the second lens group G2 in an optical axis direction to correct an image plane variation associated with the zooming. The focus control unit 6 is structured to perform focusing by moving the first lens group G1 and/or the fourth lens group G4 when the object distance is changed.

So far, the present invention has been described by way of the embodiments and Examples, but the present invention is not limited to the foregoing embodiments and Examples and various modifications may be made. For example, values of the radius of curvature of each lens, surface distance, refractive index, Abbe number, aspherical surface coefficient, and the like are not limited to those illustrated in each numerical example and may take other values.

What is claimed is:

1. A zoom lens consisting essentially of four lens groups, composed of a first lens group having a positive refractive power, a second lens group having a negative refractive power, a third lens group having a negative refractive power, and a fourth lens group having a positive refractive power, in order from the object side, wherein:

upon zooming from the wide angle end to the telephoto end, the first lens group and the fourth lens group are fixed with respect to the image plane, the third lens group is moved monotonously from the object side to the image side, and the second lens group is moved to correct an image plane variation associated with the zooming;

the first lens group is composed essentially of a first-a lens group having a positive refractive power and is fixed with respect to the image plane upon focusing and a first-b lens group having a positive refractive power and is moved upon focusing, in order from the object side; and the zoom lens satisfies conditional expressions (1), (6), and (7) given below:

$$0 < M2/M3 < 1.0 \quad (1)$$

$$2.0 < f1a/f1 < 3.7 \quad (6)$$

$$1.0 < f1b/f1 < 1.8 \quad (7)$$

where f1a: focal length of the first-a lens group,
f1b: focal length of the first-b lens group,
f1: focal length of the first lens group,
M2: amount of movement of the second lens group upon zooming from the wide angle end to the telephoto end, and
M3: amount of movement of the third lens group upon zooming from the wide angle end to the telephoto end, in which the sign of each of M2 and M3 is positive for a movement to the image side.

2. A zoom lens consisting essentially of four lens groups, composed of a first lens group having a positive refractive power, a second lens group having a negative refractive power, a third lens group having a negative refractive power, and a fourth lens group having a positive refractive power, in order from the object side, wherein:

upon zooming from the wide angle end to the telephoto end, the first lens group and the fourth lens group are fixed with respect to the image plane, the third lens group is moved monotonously from the object side to the image side, and the second lens group is moved to correct an image plane variation associated with the zooming;

the fourth lens group is composed essentially of a fourth-a lens group having a positive refractive power, a stop, and a fourth-b lens group, in order from the object side; and the zoom lens satisfies conditional expressions (1), (8), and (9) given below:

$$0 < M2/M3 < 1.0 \quad (1)$$

$$0.4 < f4a/f4 < 1.2 \quad (8)$$

$$-0.4 < f4/f4b < 0.6 \quad (9)$$

where f4a: focal length of the fourth-a lens group,
f4b: focal length of the fourth-b lens group,
f4: focal length of the fourth lens group,
M2: amount of movement of the second lens group upon zooming from the wide angle end to the telephoto end, and
M3: amount of movement of the third lens group upon zooming from the wide angle end to the telephoto end, in which the sign of each of M2 and M3 is positive for a movement to the image side.

3. A zoom lens consisting essentially of four lens groups, composed of a first lens group having a positive refractive power, a second lens group having a negative refractive power, a third lens group having a negative refractive power, and a fourth lens group having a positive refractive power, in order from the object side, wherein:

upon zooming from the wide angle end to the telephoto end, the first lens group and the fourth lens group are fixed with respect to the image plane, the third lens group is moved monotonously from the object side to the image side, and the second lens group is moved to correct an image plane variation associated with the zooming;

the second lens group is composed essentially of a 21$^{st}$ lens with a concave surface on the image side, a 22$^{nd}$ lens having a positive refractive power with a convex surface on the image side, and a 23$^{rd}$ lens having a negative refractive power with a concave surface on the object side, in order from the object side; and the zoom lens satisfies conditional expressions (1) and (11) given below:

$$0<M2/M3<1.0 \qquad (1)$$

$$vd22<vd23<50 \qquad (11)$$

where
- vd22: Abbe number of the 22$^{nd}$ lens with respect to the d-line,
- vd23: Abbe number of the 23$^{th}$ lens with respect to the d-line,
- M2: amount of movement of the second lens group upon zooming from the wide angle end to the telephoto end, and
- M3: amount of movement of the third lens group upon zooming from the wide angle end to the telephoto end, in which the sign of each of M2 and M3 is positive for a movement to the image side.

4. The zoom lens as claimed in claim 1, wherein the zoom lens satisfies a conditional expression (1-1) given below:

$$0<M2/M3<0.5. \qquad (1\text{-}1)$$

5. The zoom lens as claimed in claim 1, wherein the zoom lens satisfies a conditional expression (2) given below:

$$1.0<|f2/fw|<2.0 \qquad (2)$$

where
- f2: focal length of the second lens group, and
- fw: focal length of the entire system at the wide angle end.

6. The zoom lens as claimed in claim 1, wherein the zoom lens satisfies a conditional expression (3) given below:

$$0.4<|f3/fw|<0.9 \qquad (3)$$

where
- f3: focal length of the third lens group, and
- fw: focal length of the entire system at the wide angle end.

7. The zoom lens as claimed in claim 1, wherein the zoom lens satisfies a conditional expression (4) given below:

$$1.0<f1/fw<1.5 \qquad (4)$$

where
- fw: focal length of the entire system at the wide angle end.

8. The zoom lens as claimed in claim 1, wherein the second lens group includes at least one aspherical surface.

9. The zoom lens as claimed in claim 1, wherein the zoom lens satisfies a conditional expression (5) given below:

$$0.6<f4/fw<1.0 \qquad (5)$$

where
- f4: focal length of the fourth lens group, and
- fw: focal length of the entire system at the wide angle end.

10. The zoom lens as claimed in claim 2, wherein:

the fourth-b lens group is composed essentially of a fourth-b1 lens group having a negative refractive power and is fixed with respect to the image plane upon focusing in near view imaging and a fourth-b2 lens group having a positive refractive power and is moved upon focusing in near view imaging, in order from the object side; and the zoom lens satisfies a conditional expression (10) given below:

$$-0.1<fw/fA<0.1 \qquad (10)$$

where
- fw: focal length of the entire system at the wide angle end, and
- fA: focal length of an optical system that combines the first lens group to the fourth-b1 lens group at the wide angle end.

11. The zoom lens as claimed in claim 1, wherein the zoom lens satisfies a conditional expression (1-2) given below:

$$0.15<M2/M3<0.35. \qquad (1\text{-}2)$$

12. The zoom lens as claimed in claim 1, wherein the zoom lens satisfies a conditional expression (2-1) given below:

$$1.1<|f2/fw|<1.8 \qquad (2\text{-}1)$$

where
- f2: focal length of the second lens group, and
- fw: focal length of the entire system at the wide angle end.

13. The zoom lens as claimed in claim 1, wherein the zoom lens satisfies a conditional expression (3-1) given below:

$$0.45<|f3/fw|<0.8 \qquad (3\text{-}1)$$

where
- f3: focal length of the third lens group, and
- fw: focal length of the entire system at the wide angle end.

14. The zoom lens as claimed in claim 1, wherein the zoom lens satisfies a conditional expression (4-1) given below:

$$1.1<f1/fw<1.45 \qquad (4\text{-}1)$$

where
- fw: focal length of the entire system at the wide angle end.

15. The zoom lens as claimed in claim 1, wherein the zoom lens satisfies a conditional expression (5-1) given below:

$$0.7<f4/fw<0.9 \qquad (5\text{-}1)$$

where
- f4: focal length of the fourth lens group, and
- fw: focal length of the entire system at the wide angle end.

16. The zoom lens as claimed in claim 1, wherein:

the first lens group is composed essentially of a first-a lens group having a positive refractive power and is fixed with respect to the image plane upon focusing and a first-b lens group having a positive refractive power and is moved upon focusing, in order from the object side; and the zoom lens satisfies conditional expressions (6-1) and (7-1) given below:

$$2.2<f1a/f1<3.3 \qquad (6\text{-}1)$$

$$1.2<f1b/f1<1.6. \qquad (7\text{-}1)$$

17. The zoom lens as claimed in claim 2, wherein:

the fourth lens group is composed essentially of a fourth-a lens group having a positive refractive power, a stop, and a fourth-b lens group in order from the object side; and the zoom lens satisfies conditional expressions (8-1) and (9-1) given below:

$$0.5<f4a/f4<1.0 \qquad (8\text{-}1)$$

$$-0.2<f4/f4b<0.45 \qquad (9\text{-}1)$$

where
- f4a: focal length of the fourth-a lens group,
- f4b: focal length of the fourth-b lens group, and
- f4: focal length of the fourth lens group.

18. An imaging apparatus equipped with the zoom lens as claimed in claim 1.

19. An imaging apparatus equipped with the zoom lens as claimed in claim 2.

20. An imaging apparatus equipped with the zoom lens as claimed in claim 3.

* * * * *